(12) United States Patent
Klettke

(10) Patent No.: US 9,688,408 B2
(45) Date of Patent: Jun. 27, 2017

(54) PASSENGER SEAT FOR A MEANS OF TRANSPORTATION

(71) Applicant: Airbus Operations GmbH, Hamburg (DE)

(72) Inventor: Marcus Klettke, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 14/793,923

(22) Filed: Jul. 8, 2015

(65) Prior Publication Data
US 2016/0009398 A1 Jan. 14, 2016

(30) Foreign Application Priority Data
Jul. 8, 2014 (EP) .................... 14 176 128

(51) Int. Cl.
*B64D 11/06* (2006.01)
*B60N 2/44* (2006.01)

(52) U.S. Cl.
CPC ............ *B64D 11/0627* (2014.12); *B60N 2/44* (2013.01); *B64D 11/0633* (2014.12); *B64D 11/0636* (2014.12); *Y02T 50/46* (2013.01)

(58) Field of Classification Search
CPC ............ B64D 11/0627; B64D 11/0629; B64D 11/0631; B64D 11/0632; B64D 11/0633; B64D 11/0636; B60N 2/44; Y02T 50/46
See application file for complete search history.

(56) References Cited

U.S. PATENT DOCUMENTS

| | | | |
|---|---|---|---|
| 5,816,650 A | 10/1998 | Lucas, Jr. | |
| 5,902,009 A | 5/1999 | Singh et al. | |
| 6,161,896 A | 12/2000 | Johnson et al. | |
| 6,588,839 B1 | 7/2003 | Salzer | |
| 7,517,014 B2 | 4/2009 | Schroeder et al. | |
| 8,128,163 B2 * | 3/2012 | Alberti ................ | B60R 5/003 296/37.15 |

(Continued)

FOREIGN PATENT DOCUMENTS

| | | |
|---|---|---|
| AT | 365128 T | 5/1981 |
| CH | 408678 A | 8/1966 |

(Continued)

OTHER PUBLICATIONS

European Patent Office, Extended European Search Report for European Patent Application No. 14176128.8 mailed Dec. 23, 2014.

*Primary Examiner* — Philip Gabler
(74) *Attorney, Agent, or Firm* — Lorenz & Kopf, LLC

(57) ABSTRACT

A passenger seat for a means of transportation is provided, which comprises a seat frame with a top side, which top side is configured for supporting a seat pan with a seat cushion for providing a seating area for a passenger, and a bottom side opposing the top side. The passenger seat further comprises a stowage cavity arranged between the top side and the bottom side of the seat frame. The seat frame further comprises a first beam and a second beam, both beams being arranged parallel to each other and parallel to a transversal axis of the passenger seat. The top side of the seat frame provides an access to the stowage cavity such that a stowage compartment, which is configured to accommodate an item of luggage, is insertable into the stowage cavity through the access.

19 Claims, 12 Drawing Sheets

(56) References Cited

U.S. PATENT DOCUMENTS

| | | | |
|---|---|---|---|
| 8,616,631 B2* | 12/2013 | Westerink | B60N 2/24 297/188.08 |
| 2001/0035670 A1 | 11/2001 | Prasatek | |
| 2003/0222174 A1 | 12/2003 | Saint-Jalmes | |
| 2006/0163917 A1* | 7/2006 | Schroeder | B64D 11/06 297/188.1 |
| 2008/0061606 A1 | 3/2008 | Skelly et al. | |
| 2008/0099608 A1 | 5/2008 | Schumacher et al. | |
| 2008/0106127 A1* | 5/2008 | Hough | B64D 11/0629 297/188.08 |
| 2009/0139519 A1* | 6/2009 | Deutscher | A62B 7/14 128/202.26 |
| 2009/0194635 A1 | 8/2009 | Ehlers et al. | |
| 2010/0045082 A1 | 2/2010 | Alberti | |
| 2010/0231011 A1 | 9/2010 | Lindsay | |
| 2011/0148173 A1 | 6/2011 | Westerink et al. | |
| 2012/0169095 A1* | 7/2012 | Petit | B60N 2/305 297/188.09 |
| 2013/0175831 A1* | 7/2013 | Reh | B64D 11/06 297/135 |
| 2013/0234486 A1 | 9/2013 | Duus et al. | |
| 2014/0027572 A1 | 1/2014 | Ehlers et al. | |

FOREIGN PATENT DOCUMENTS

| | | |
|---|---|---|
| DE | 2034103 A1 | 1/1972 |
| DE | 9310246 U1 | 9/1993 |
| DE | 19752383 A1 | 5/1999 |
| DE | 10224048 A1 | 12/2003 |
| DE | 2020044008069 U1 | 9/2004 |
| DE | 502005000889 A1 | 8/2005 |
| DE | 10 2004 050 082 A1 | 4/2006 |
| DE | 102004050082 A1 | 4/2006 |
| DE | 102010024425 A1 | 2/2011 |
| EP | 0348130 A2 | 6/1989 |
| EP | 0980790 A2 | 8/1999 |
| EP | 1371555 A2 | 7/2002 |
| EP | 1647483 A1 | 4/2006 |
| EP | 2705984 A1 | 9/2012 |
| EP | 2607234 A2 | 6/2013 |
| EP | 2690016 A2 | 1/2014 |
| WO | 8800895 A1 | 2/1988 |
| WO | 2012041465 A1 | 4/2012 |

* cited by examiner

PASSENGER SEAT FOR A MEANS OF TRANSPORTATION

CROSS REFERENCE TO RELATED APPLICATIONS

This application claims priority to European Patent Application No. EP 14 176 128.8 filed Jul. 8, 2014, which is incorporated herein by reference in its entirety.

TECHNICAL FIELD

The embodiments described herein generally relate to interior components for a means of transportation. In particular, the embodiments relate to a passenger seat for a means of transportation and to a stowage compartment for a means of transportation. The embodiment further relates to an aircraft comprising such passenger seat and stowage compartment.

BACKGROUND

In means of transportation, in particular in a cabin of an aircraft, stowage and/or storage space is usually rather restricted and scarce. Thus, an efficient and optimum use of the available stowage space may be regarded important from an economic point of view.

WO 2012/041465 A1 describes a passenger seat system including a backrest and a seat, which has a first sub-portion having a first surface and a second, opposite surface to the first surface as well as a second sub-portion having a first surface and a second, opposite surface to the first surface. The sub-portions are relatively movable.

EP 1 647 483 A1 describes an aircraft passenger seat with a substructure, containing a cavity, onto which the seat surface can be closed, and subsequently raised for access to the cavity.

Other objects, desirable features and characteristics will become apparent from the subsequent summary and detailed description, and the appended claims, taken in conjunction with the accompanying drawings and this background.

SUMMARY

According to a first aspect of the present embodiment, a passenger seat for a means of transportation is provided. The passenger seat comprises a seat frame with a top side, which top side is configured for supporting a seat pan with a seat cushion for providing a seating area for a passenger, and a bottom side, which bottom side opposes the top side. The passenger seat further comprises a stowage cavity arranged between the top side and the bottom side of the seat frame. Further, the passenger seat may comprise a locking device. Therein, the top side of the seat frame provides an access to the stowage cavity such that a stowage compartment, which is configured to accommodate an item of luggage, is insertable into the stowage cavity through the access and may then at least indirectly be attachable to the seat frame by the locking device. The seat frame further comprises a first beam and a second beam, both beams being arranged parallel to each other and parallel to a transversal axis of the passenger seat. The first beam and the second beam are adapted for mounting a stowage compartment. The seat frame further comprises an inclined strut extending in a region at the bottom side of the seat frame. The region at the bottom side of the seat frame may be between the top side and the bottom side of the seat frame. Furthermore, the inclined strut and a horizontal axis of the passenger seat and/or the seat frame may enclose an angle which is less than 45 degrees. Therein, the strut may be a part of the seat frame.

The means of transportation may for instance be a bus, a train, a car, a truck, an aircraft, an airplane, or an airship.

The means of transportation may comprise a plurality of passenger seats, which may for instance be arranged in rows in a cabin of the means of transportation. A row of passenger seats may be characterized by the passenger seats placed next to each other so that a passenger sitting on the passenger seat may have a neighbouring passenger seat to the left and/or to the right. A seating direction of the passenger sitting on the passenger seat may be the driving direction of the means of transportation. The passenger seats of a row of passenger seats may then be arranged next to each other along a transversal axis of the passenger seat which may substantially be transversal to the driving direction of the means of transport.

It may be possible to serially arrange a plurality of rows of passenger seats along the horizontal, i. e. longitudinal, axis of the passenger seat. Therein, the horizontal axis of the passenger seat may be substantially perpendicular to the transversal axis of the passenger seat. The horizontal axis of the passenger seat may also be parallel to a floor of the means of transportation.

The seat pan may comprise a frame element and/or a plate, on which the seat cushion may be mounted and/or attached. The seat pan may be arranged on a top side of the seat frame. The bottom side of the seat frame may denote a boundary and/or lower end of the seat frame, which boundary may be mounted and/or attached to a floor in the means of transportation. The bottom side of the seat frame may oppose the top side, which top side may denote a further boundary and/or an upper end of the seat frame. An inclined strut may be attached to or arranged at the lower end of the seat frame. This inclined strut may have an inclination angle which is for instance between 0 and 90 degrees with respect to a floor of the means of transportation and/or the horizontal axis of the passenger seat.

The stowage cavity may be a stowage space, which may be arranged underneath the seat pan and at least partially within the seat frame. The stowage cavity may at least partially range from the bottom side to the top side of the seat frame and/or it may even extend beyond the bottom and/or the top side of the seat frame. The stowage cavity may denote a space in the seat frame, which may be free of obstacles and/or structural elements e.g. of the passenger seat. The first beam and the second beam are configured and/or adapted for mounting a stowage compartment. Therein, the beams may for instance be tube-like shaped. The beams may be arranged in a region at the top side of the seat frame. For example, the first beam and the second beam may be arranged transversal to the seating direction of a passenger and they also may extend along the row of passenger seats, i. e. along several passenger seats. Therefore, the first beam and the second beam may be mounted and/or attached in a region at the top side of the seat frame as to be parallel to each other. Both beams may also be substantially parallel to the transversal axis of the passenger seat.

The locking device may for instance comprise a mechanical fixation means, such as e.g. a hook-like element, which may be adapted to lock and/or fasten and/or secure a stowage compartment in the stowage cavity to the seat frame. The locking device may also comprise an electric, magnetic and/or electronic locking actuator. The locking device may also be part of a stowage compartment. The locking device may merely be adapted to provide a friction fit of a stowage compartment with at least a part of the seat frame, such as e.g. at least one beam of the seat frame.

The access provided by the top side of the seat frame may for instance denote an opening and/or an area free of obstacles in the top side of the seat frame such that a stowage compartment may be inserted through this access into the stowage cavity.

The seat pan may be movable to a seating position, in which the seating area is provided to the passenger and in which the stowage cavity may be covered by the seat pan. The seat pan may further be movable to a stowing position, in which the access to the stowage cavity may be provided.

By using the space provided by the stowage cavity, which may be arranged underneath the seat pan and the seating area of the passenger, an additional space for storing items may be provided. Therein, not only items belonging to the passenger may be stored, but also any other item, e.g. belonging to the crew, and/or other objects dedicated for example for maintenance of the means of transportation, such as tools. Using an already available space underneath or inside a passenger seat may provide an efficient way of using space available aboard the means of transportation, which in turn may provide additional stowage space in the means of transportation.

According to an embodiment, the angle enclosed by the inclined strut and the horizontal axis of the passenger seat and/or the seat frame is between 15 degrees and 25 degrees. In a preferred configuration this angle amounts to 21 degrees.

According to an embodiment, the seat pan is pivotably mounted with a mounting device to the seat frame.

For example, the seat pan may be moved from the seating position to the stowing position in a direction of a backrest of the passenger seat, such that the access to the stowage cavity may be provided. Thus, the seat pan may be swung and/or folded towards the backrest and may then at least be partially in contact with the backrest in the stowing position. By pivotably mounting the seat pan with the mounting device to the seat frame, the access to the stowage cavity may easily be provided to a passenger and/or any personnel aboard the means of transportation. Apart from that, the mounting device may provide an easy, low cost, and low weight-way of mechanically fixing the seat pan while providing an easy usage.

According to an embodiment, the mounting device comprises a spring element and/or a spring device and a hinge element and/or hinge device. The spring element may for instance be an elastic spring and/or a coil spring and/or a gas spring device, which may be attached with a first end to the seat pan and with a second end to the seat frame and/or the backrest. The hinge element of the mounting device may for example be arranged between the seat pan and the seat frame and/or the backrest of the passenger seat. The hinge element may for example comprise a regular hinge, a pin joint, a pivot, a universal link, a flexible joint, or any other appropriate joint between the seat pan and the seat frame and/or the backrest allowing to move the seat pan from the stowing position to the seating position and vice versa.

According to an embodiment, the spring element is preloaded in a direction of a backrest and the spring element is configured to pull the seat pan towards the backrest. The seat pan may, thus, be biased towards the stowing position, in which the seat pan may be moved towards the backrest. The seat pan may further be held in the stowing position by the spring element, if no passenger is sitting on the passenger seat. Also a locking system may be provided, which may prevent opening of the stowage cavity, even if no passenger is sitting on the passenger seat. The term "preloaded" may be understood as or may comprise spring-loaded and/or biased.

By arranging the spring element, which may hold the seat pan in the stowing position, the access may be brought to an attention of a passenger e.g. while boarding the means of transportation. On the other hand, when leaving or deboarding the means of transportation, the passenger's attention may be brought again to a stowage compartment, in which some of his luggage may be stored. Also the crew may easily check all stowage compartments if the seat pan is held in the stowing position by the spring element while no passengers may be aboard.

According to yet another embodiment, the seat pan is removably attached to the seat frame. Also in this embodiment, the passenger seat may comprise a mounting device, which may allow to removably attach the seat pan to the seat frame. The mounting device may for example comprise a screw joint and/or a bolt joint and/or clamp device allowing the seat pan to be fastened to the seat frame.

Also in this embodiment, the seat pan may comprise a stowing position and a seating position and the seat pan may be movable from the stowing position to the seating position and vice versa, wherein in the stowing position the seat pan may be removed from the seat frame, such that the access to the stowage cavity and a stowage compartment may be provided.

According to yet another embodiment, the first beam defines a first boundary of the stowage cavity and the second beam defines a second boundary of the stowage cavity, which second boundary opposes the first boundary. Therein, the first beam and the second beam are spaced apart from each other, such that the access, through which a stowage compartment may be inserted, is provided between the first beam and the second beam. Moreover, the first beam and the second beam may be arranged parallel to each other and/or parallel to the transversal axis of the passenger seat.

Amongst defining a first boundary of the stowage cavity, the first beam may also define a first boundary of the access. Similarly, the second beam may define a second boundary of the access. The first beam and the second beam may for example be arranged parallel to the seat pan in the seating position as well as parallel to a backrest of the passenger seat. Both the first beam and the second beam may serve to transfer any load and/or force exerted on the passenger seat. The first beam and the second beam may, thus, provide a load bearing structure for the passenger seat. The first beam and the second beam may for instance be duct-like shaped and may be manufactured from aluminium or composite material, such as carbon fibre reinforced plastic material. However, the first and the second beam as well as other components of the seat frame may also be manufactured from metal material, such as e.g. steel or any other alloy. The first and the second beam may comprise for example a rectangular, a round, an elliptic, a triangular, an oval, or a polygon-like cross-section.

In order to provide an access to the stowage cavity and in order to be able to arrange a stowage compartment which is adequately sized, the first beam and the second beam may be spaced apart from each other at least 20 cm, preferably 30 cm, and particularly approximately 40 cm. However, the first beam and the second beam may also be spaced apart from each other by more than 40 cm. By spacing both the first beam and the second beam at a large distance from each other, a surface and/or an area of the access and consequently an area of a stowage compartment may be increased, allowing to safely store even comparably large items of luggage underneath the seat.

According to another embodiment, the passenger seat further comprises a stowage compartment. The stowage compartment may be detachably mounted to a beam of the seat frame. The stowage compartment may, thus, be detachably mounted to at least one of the first beam and the second beam.

The term stowage compartment may denote a bin-like element, which may be adapted to accommodate an item of luggage, such as a handbag. In the stowage compartment, basically any other item or object, which is appropriately sized to fit in the stowage compartment, may be stored and/or accommodated therein.

According to an embodiment, the seat pan provides a lid for the stowage compartment. By using the seat pan as a lid for the stowage compartment, an additional lid for the stowage compartment may not be required and the weight of the stowage compartment may further be reduced. Therein, the seat pan may cover the stowage compartment as well as the stowage cavity in the seating position. On the other hand, access to the top side of the seat frame as well as the stowage compartment and the stowage cavity may be provided in the stowing position of the seat pan.

According to the embodiment, a stowage compartment for a passenger seat is provided. The stowage compartment may be bin-like shaped and comprises a bottom side, a front side, a rear side, and two lateral sides. The bottom side of the stowage compartment and a horizontal axis of the stowage compartment further enclose an angle that is greater than zero degrees, such that a cavity for accommodating a foot of a further passenger sitting behind the passenger seat is provided.

The horizontal axis of the stowage compartment may substantially be perpendicular to the front side and/or to the rear side of the stowage compartment. The horizontal axis of the stowage compartment may rather be arranged such that an angle between the front side of the stowage compartment and the horizontal axis of the stowage compartment is less than an angle between the rear side of the stowage compartment and the horizontal axis of the stowage compartment. The horizontal axis of the stowage compartment may also be parallel or substantially parallel to the horizontal axis of the passenger seat if the stowage is inserted into the cavity of the passenger seat. The front side and the rear side of the stowage compartment may be arranged parallel to each other. Furthermore, the front side and the rear side of the stowage compartment may be arranged perpendicular to at least one of the two lateral sides of the stowage compartment. The rear side of the stowage compartment may be arranged in an obtuse angle with respect to a bottom side of the stowage compartment. Furthermore, the bottom side of the stowage compartment may be inclined with respect to the horizontal axis of the passenger seat if the stowage compartment is inserted into the stowage cavity. In other words, the bottom side may have the same inclination as the strut such that the stowage compartment may be held in space by the inclined strut. The bottom side may then be in contact with the inclined strut. It is further possible that the inclination angle of the bottom side of the stowage compartment with respect to the horizontal axis of the passenger seat is greater than the inclination angle of the strut with respect to the horizontal axis of the passenger seat. In this manner, a space below the passenger seat for a foot of a further passenger behind the passenger seat can always be kept free.

The passenger seat may comprise an attachment device. The stowage compartment may be detachably mounted to one of the first beam and/or the second beam e.g. by a hook element and/or a screw joint. Besides a mechanical fixation of the stowage compartment on at least one of the beams, the attachment device may also comprise an electronic securing device. By employing an electronic securing device, it may be ensured by any personnel aboard the means of transportation that all stowage compartments used aboard the means of transportation may be properly secured. Moreover, it may be avoided that for instance a passenger may detach the stowage compartment, which may be undesired by the crew e.g. during a flight. The attachment device may further comprise a signalling device, comprising e.g. a signal lamp, which may indicate a proper fastening and/or securing of the stowage compartment in the stowage cavity. The signalling lamp may for example directly bring a proper securing and fastening of the stowage compartment to the attention of any personnel aboard the means of transportation as well as to the attention of a passenger sitting on the passenger seat. The attachment device may also be part of the locking device or vice versa.

According to an embodiment, the stowage compartment is bin-like shaped and comprises a bottom side, a front side, a rear side, and two lateral sides such that a cavity for accommodating a foot of a further passenger sitting behind the passenger seat is provided. Therein, the bottom side of the stowage compartment may be directed towards a floor element and/or a floor of the means of transportation whereas the front side may be directed towards the passenger's legs while sitting on the passenger seat. Moreover, the rear side may oppose the front side, i.e. the rear side may be directed towards a further passenger sitting behind the passenger located on the passenger seat. Generally, any geometry of the stowage compartment is conceivable, such as a cylindrical shape, a box-like shape, an elliptic shape, or a polygon-like shape.

According to another embodiment, the angle between the bottom side of the stowage compartment and the horizontal axis of the stowage compartment is between 10 degrees and 60 degrees. In a preferred embodiment this angle amounts to 21 degrees, which may advantageously provide space for the further passengers sitting behind the passenger to accommodate and/or arrange his feet and/or at least a part of his legs underneath the stowage compartment in front of him.

Generally, the stowage compartment may be shaped in a way, which reflects the available space underneath the seat pan of the passenger seat. For example, in case the passenger seat may be arranged directly on a fuselage of the means of transportation, such as an aircraft, the shape of the stowage compartment may reflect the shape of the fuselage, thus one of the lateral sides may be shaped and/or formed in conformity with the shape of the fuselage. For instance, any side of the stowage compartment may be at least partially angled and/or inclined with respect to the bottom side. The stowage compartment may also at least partially have a round shape. Apart from that, the stowage compartment may also reflect any obstacles, which may be present underneath the passenger seat. For this purpose, also one or more cavities may be arranged in the stowage compartment, such that the stowage compartment may be flush with any boundary or any element potentially being present in the stowage cavity.

The stowage compartment may further be partially or entirely bag-like shaped. In other words, the stowage compartment may at least partially be a stowage bag. For instance at least one side or several sides of the stowage compartment may be manufactured from a net-like and/or a textile-like fabric, a mesh, a net, a flexible plastic material, and/or the like. In particular the rear side and/or the front side may be manufactured from such material. This may for example allow to fold the stowage compartment while it is not in use and to unfold it in case additional stowage space may be required. As a consequence, the further passenger's legroom may not be affected by the stowage compartment in any way in case the stowage compartment is empty. For this purpose, the stowage compartment may further comprise a spring device, which may be adapted to fold the unused stowage compartment e.g. in a direction of the top side of the seat frame and/or in a direction of the front side of the stowage compartment. When the passenger inserts an item into the stowage compartment, the stowage compartment may be unfolded e.g. by a weight of the item stored therein.

According to yet a further embodiment, the rear side of the stowage compartment is at least partially arranged in an obtuse angle with respect to the bottom side of the stowage compartment, such that a cavity for accommodating a foot of a further passenger sitting behind the passenger and/or sitting behind the passenger seat is provided. In other words, the rear side of the stowage compartment may be at least partially arranged inclined and/or angled with respect to the bottom side of the stowage compartment. The arrangement of the rear side of the stowage compartment in an obtuse angle with respect to the bottom side may advantageously provide space for the further passengers sitting behind the passenger to accommodate and/or arrange his feet and/or at least a part of his legs underneath the passenger seat in front of him. As a consequence, a legroom for the further passenger may be extended and/or additionally provided. This may additionally allow to reduce a pitch between rows of passenger seats inside the means of transportation. Therein, the pitch may denote a distance between two passenger seats arranged behind each other.

According to another embodiment, the stowage compartment is manufactured from a material selected from the group comprising composite material, plastic material, and aluminium. Therein, composite material may for instance be carbon fibre reinforced plastic material and/or carbon fibre laminate material as well as glass fibre reinforced plastic material and/or glass fibre laminate. Also a mixture of the above-mentioned materials may be used for manufacturing the stowage compartment. By using one of the above-mentioned materials, a low weight stowage compartment may be provided, which may advantageously reduce for instance fuel costs for the means of transportation. Apart from that, the stowage compartment may be manufactured in a robust and load bearing manner.

According to yet another embodiment, the stowage compartment comprises a battery pack for storing electrical energy and a connection element configured for electrically connecting the battery pack to an electric consumer. By arranging a battery pack inside the stowage compartment, electrical energy may be provided to certain devices and/or electrical energy may be provided for operating electrical devices. The battery pack may basically be or comprise any battery, such as lead accumulators, lithium-ion accumulators, or polymer accumulators, NiMH accumulators.

The above-mentioned embodiment may advantageously extend for instance a range of an electric vehicle. The battery pack and/or the electrical energy stored therein may for example be used for an illumination of an interior of the means of transportation. Apart from that, it is also conceivable that the electrical energy stored in the battery pack may be used for instance for a heating or an air-condition in case a temperature may be above or below a certain threshold. As mentioned above, the electrical energy stored in the battery pack may also be used as a range extender for the vehicle or the means of transportation. Furthermore, by arranging a battery pack in the stowage compartment, which may for example be portable and taken away with each passenger while leaving the means of transportation as well as which may be brought into the stowage compartment and stored therein when a passenger enters the means of transportation, it may be ensured that no battery pack remains inside the means of transportation. This may advantageously provide safety in terms of a thievery-safe battery pack. Moreover, a portable battery pack may be brought from a low-temperature environment into a an environment with higher temperature, which may prevent unwanted discharging and that may extend a life-time of the battery pack.

It is to be mentioned here, that the passenger seat as described in the above and in the following is not restricted to a regular passenger seat aboard a means of transportation, but may also denote for instance a passenger seat in a vehicle, such as e.g. a car, and/or a seat of a driver of the vehicle. Thus, the electrical energy stored in the battery pack may be used by an electric vehicle additionally or alternatively to a main source of energy in the vehicle.

The connection element may for example serve to charge the battery pack while the means of transportation is in movement and for example a generator or any other source of energy may provide the electrical energy to charge the battery pack. Apart from that, the connection element may also serve for transferring the stored electrical energy to any other device. For example, in an aircraft, the battery pack may serve to provide energy for instance for a monitor and/or any other entertainment system of the passenger seat. Also electric devices of the passengers, such as e.g. notebooks or the like, may be charged using the battery pack. By equipping the stowage compartment with an electrical connection, it may always be ensured that the battery pack is fully charged. Additionally, by arranging the battery pack inside the means of transportation, which usually is a warm and dry environment, an unwanted unloading and/or discharging of the battery pack, for instance due to leakage currents, may be avoided. In particular, in contrast to a motor compartment where temperatures and conditions usually are not optimal for the battery pack, such leakage currents may be avoided by storing the battery pack inside the stowage compartment. Moreover, this may also extend a lifetime of the battery pack. The temperature inside the stowage compartment may be different, e. g. higher, than in the cabin of the aircraft such that required storing conditions for battery packs and other sensitive electric or electronic devices may be provided.

According to another embodiment, the seat pan is attached to the stowage compartment. The seat pan may for instance be attached to the stowage compartment by a mounting device and/or an attachment device, which may comprise a hinge element. In this embodiment for instance the entire seat pan with the stowage compartment may be stored or inserted into the stowage cavity through the access. This may advantageously reduce components required for a comprehensive stowage compartment and the seat pan.

According to a further embodiment, the passenger seat further comprises a backrest with a backrest cushion adapted for providing a leaning area for the passenger and a life vest, which is arranged on a rear side of the backrest. The rear side of the backrest may oppose the leaning area with respect to a mid-plane through the backrest parallel to the leaning area. By arranging the life vest in the backrest of the passenger seat, each passenger seat may provide a life vest to the further passenger sitting behind the passenger seat. Apart from that, a seat belt for fastening the passenger on the passenger seat may be arranged on the passenger seat. Therein, the seat belt may comprise a reeling device that may be adapted for reeling or rolling up the seat belt. This may allow to prevent any coiling of the seat belt for instance in case the seat pan is moved to the stowing position. Accordingly, the life vest and also an in-flight entertainment system, which may usually be stored underneath the passenger seat, may be arranged and/or stored in the backrest. The life vest and/or the in-flight entertainment system may also be arranged and/or stored e.g. on a seat leg of the passenger seat, for instance in an upright position.

According to another embodiment, the stowage compartment comprises a hingeable handle for transporting the stowage compartment. The handle, i. e. trolley handle, may for instance be hingeably mounted to at least one of the two lateral sides of the stowage compartment. In case the stowage compartment is inserted in the stowage cavity, at least a part of the handle may also be in contact with the second beam so as to be the front edge of the seat pan.

The hingeable handle of the stowage compartment may be adapted to serve as a means for cushioning the front edge of the seat pan in a region at the second beam. The hingeable handle may as well serve as a means for unlocking the stowage compartment and/or lifting the stowage compartment out of the stowage cavity. The hingeable handle may also serve as a trolley that is pulled and/or dragged by a passenger in case the stowage compartment is not inserted into the stowage cavity of the passenger seat, e. g. while boarding or de-boarding the means of transportation. It is also possible that a telescopic handle is attached and/or mounted to the stowage compartment. This telescopic handle may also be hingeable.

The stowage compartment may further be in contact with the inclined strut if the stowage compartment is inserted into the stowage cavity. Therefore, the bottom side of the stowage compartment and the strut may have the same inclination with respect to a floor of the means of transportation and/or the horizontal axis of the passenger seat and/or the horizontal axis of the stowage compartment.

Another aspect of the embodiment relates to an aircraft comprising a passenger seat and a stowage compartment as described in the above and in the following. Therein, the aircraft may comprise a plurality of passenger seats, which may for instance be arranged in rows in a cabin of the aircraft and/or in a cockpit of the aircraft. The passenger seat may not only be provided to a passenger but also to any crew or any personnel aboard the aircraft. For this purpose, the passenger seat as described in the above and in the following, may also be arranged and/or mounted for instance directly on a fuselage of the aircraft, for example on a floor within the aircraft. The aircraft may further comprise a plurality of stowage compartments. Therefore, each of the plurality of passenger seats may provide a stowage cavity into which a stowage compartment may be inserted.

If technically possible but not explicitly mentioned, also combinations of any embodiments as described in the above and in the following may be embodiments of the passenger seat as well as the aircraft comprising the passenger seat.

BRIEF DESCRIPTION OF THE DRAWINGS

The various embodiments will hereinafter be described in conjunction with the following drawing figures, wherein like numerals denote like elements, and.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Figure 1:
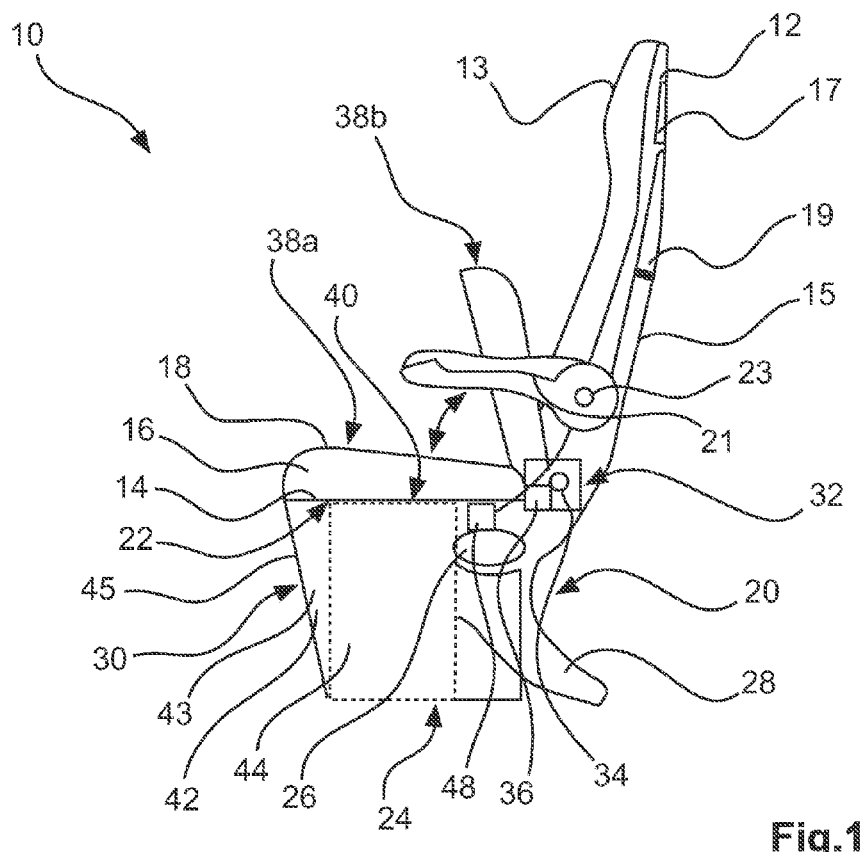
FIG. 1 schematically shows a lateral view of a passenger seat according to an embodiment.

FIG. 1 schematically shows a lateral view of a passenger seat 10 according to an embodiment.

The passenger seat 10 comprises a backrest 12 with a leaning area 13, against which a back of a passenger sitting on the passenger seat 10 may be leant. The backrest 12 further comprises a rear surface 15, which opposes the leaning area 13 with respect to a center plane through the backrest 12 and parallel to the leaning area 15. The rear surface 15 may be directed towards a further passenger sitting behind the passenger seat 10. On the rear surface 15 an entertainment device 17 may be arranged, which may serve to provide multimedia entertainment and/or information to the further passenger. Moreover, a foldable table 19 may be pivotably mounted to the rear surface 15. Also a life vest may be arranged on the rear surface 15.

On a side of the passenger seat 10, an arm-rest 21 is arranged and/or mounted. The arm-rest 21 may be mounted and/or attached to the backrest 12 with a hinge 23, such that it may be foldable and/or movable to an arm-rest position, in which the arm-rest 21 may be arranged substantially perpendicular to the backrest 12 and in which the passenger may lay and/or deposit one of his arms on the arm-rest 21. The arm-rest 21 may further be movable to a further position, in which the arm-rest 21 may be arranged substantially parallel to the backrest 12.

The passenger seat 10 further comprises a seat pan 14 with a seat cushion 16. The seat cushion 16 may be fixed and/or fastened and/or attached to the seat pan 14, for instance by gluing, by a screw joint, a bolt joint, or any other appropriate means of attachment. The seat cushion 16 comprises and/or provides a seating area 18, on which a passenger may sit.

The passenger seat further comprises a seat frame 20 with a top side 22 and a bottom side 24 opposing the top side 22 with respect to a center plane through the seat frame 20 and substantially perpendicular to the backrest 12. The top side 22 of the seat frame 20 may be configured for supporting the seat pan 14 and/or the passenger. The bottom side 24 of the seat frame 20 may be mounted to floor of a means of transportation, e.g. to a seat rail in an aircraft. Hence the bottom side 24 may be flush and/or even with a floor when mounted in the means of transportation.

The seat frame 20 further comprises a beam 26, on which the backrest 12 and the seat pan 14 with the seat cushion 16 may be at least indirectly attached and/or mounted to. The beam 26 may be elliptically shaped in cross-section as shown in FIG. 1. However, it may also have e.g. a round, a polygon-like, a rectangular, a square, or any other cross-section. The beam 26 generally may be configured to receive and/or transfer any load and/or force exerted on the passenger seat 10 to further structural elements of the means of transportation, e.g. via a seat leg 28 to a floor structure of the means of transportation. For this purpose, the beam 26 is at least indirectly mounted and/or attached to the seat leg 28, e.g. by a screw joint, a clamp joint, or any other suitable joint and/or means of attachment including welding and/or soldering. The seat leg 28 may be arranged on a side of the passenger seat 10, which side may be arranged substantially perpendicular to the leaning area 13 of backrest 12 and which may thus provide a lateral boundary of the seat frame 20. The passenger seat 10 may comprise a further seat leg 28, which may be arranged on a further, opposite side and which may provide a further lateral boundary of the seat frame 20.

Between the top side 22 and the bottom side 24 of the seat frame 20, the passenger seat 10 further comprises a stowage cavity 30. The stowage cavity 30 may laterally be defined for instance by the lateral boundaries provided by the seat legs 28 and/or defined by respective lateral boundaries of the seat pan 14. A top side of the stowage cavity 30 may be defined by the top side 22 of the seat frame 20 and a bottom side of the stowage cavity 30 may be defined by the bottom side 24 of the seat frame 20 and/or a floor of the means of transportation. The respective top sides and the respective bottom sides of both the seat frame 20 and the stowage cavity 30 may thus be aligned and/or flush with each other.

The seat pan 14 is pivotably mounted with a mounting device 32 to the seat frame 20. The mounting device 32 comprises a hinge element 34 or a hinge device 34 and a spring element 36 or a spring device 36, such that the seat pan 14 is pivotable and/or movable by means of the hinge element 34 to a seating position 38A and to a stowing position 38B. In the seating position 38A the seat pan 14 may be arranged substantially parallel to the top side 22 of the seat frame 20 and substantially perpendicular to the backrest 12, such that the seating area 18 may be provided to the passenger. On the other hand, in the stowing position 38B the seat pan 14 may be arranged substantially perpendicular to the top side 22 of the seat frame 20 and substantially parallel to the backrest 12. The spring element 36 may be preloaded in a direction of the backrest 12 and it may be configured to pull the seat pan 14 towards the backrest 12, such that the seat pan 14 may be held in the stowing position 38B when no force is exerted on the seat pan 14. However, the spring element 36 may also be configured to hold the seat pan 14 in the seating position 38A when no force is exerted on the seat pan 14.

The spring element 36 or spring device 36 may comprise a tension spring, a compression spring, a torsion spring, a flat spring, a constant spring, a coil spring, a flat spring, a machined spring, a cantilever spring, a helical spring, a leaf spring, a gas spring, a rubber band, a wave spring, or any other type of spring.

The seat frame 20 of the passenger seat 10 further comprises and/or provides an access 40 to the stowage cavity 30, which access 40 is arranged on the top side 22 of the seat frame 20. When the seat pan 14 is in the stowing position 38B, the access 40 is accessible from the top side 22 of the seat frame 20. The access 40 may in this context denote an opening and/or an area free of obstacles arranged on the top side 22, thereby providing access to the stowage cavity 30.

The passenger seat 10 further comprises a stowage compartment 42, which is insertable through the access 40 into the stowage cavity 30 from the top side 22 of the seat frame 20. The stowage compartment 42 is configured to accommodate an object, which may be an item of luggage 44 as shown in FIG. 1 or any other object, appropriately sized to fit in the stowage compartment 42, such as e.g. a battery pack. The stowage compartment 42, when inserted into the stowage cavity 30, may at least partially fill the stowage cavity 30, such that space available underneath the seat pan 14 and/or within the seat frame 20 may be efficiently used for stowing and/or storing items. In other words, a volume of the stowage compartment 42 may be maximized taking into account the space available in the seat frame 20 and/or underneath the seat pan 14 as well as taking into account e.g. a comfort of the passenger sitting on the passenger seat 10 and of a further passenger sitting behind an/or on the passenger seat 10.

In order to provide a low-weight and robust stowage compartment 42, the stowage compartment 42 may be manufactured e.g. from composite material such as carbonfiber reinforced material or glass-fiber reinforced material, from plastic material, or from aluminium.

When the stowage compartment 42 is inserted into the stowage cavity 30, the stowage compartment 42 may laterally and/or frontally be aligned and/or flush with the seat pan 14 and/or the seat cushion 16, when the seat pan 14 is located in the seating position 38A. In other words, at least one lateral side 43 and/or a front side 45 of the stowage compartment 42 may be aligned and/or may be flush with a respective lateral side and/or a front side of the seat pan 14 and/or the seat cushion 16.

When the seat pan 14 is moved to the stowing position 38B, an access to an interior of the stowage compartment 42 may be provided, such that items may be stored therein and/or may be removed therefrom. In this context, the seat pan 14 with the seat cushion 16 may provide a lid for the stowage compartment 42.

The passenger seat 10 further comprises a locking device 48 configured for locking and/or fastening and/or securing the stowage compartment 42 to the seat frame 20. The locking device 48 may for this purpose comprise e.g. mechanical fixation means for mechanically fixing, fastening, locking, and/or securing the stowage compartment 42. This may comprise appropriate attachment means, such as e.g. a screw joint, a clamp joint, a bolt joint, or any other mechanical attachment means. The locking device 48 may further comprise an electrical, an electronic and/or a magnetic actuator, which may reliably lock, fasten and/or secure the stowage compartment 42 to the seat frame 20, such that the stowage compartment 42 may not be removed from the stowage cavity 30 by any passenger, but only e.g. by a crew of the means of transportation, such as flight attendants in an aircraft. Moreover, the locking device 48 may further comprise a signal device, which may indicate proper locking, fastening and/or securing of the stowage compartment 42. For instance, the locking device 48 may comprise at least one signal lamp, such as e.g. a LED lamp, which may be arranged on the passenger seat 10 or any other place in the means of transportation, which may indicate by emission of visible light a locking status of the stowage compartment 42. For example, a red light may indicate that the stowage compartment 42 is not properly secured and/or locked, whereas a green light may indicate proper securing and/or locking of the stowage compartment 42, such that any personnel aboard the means of transportation may quickly check whether all stowage compartments 42 aboard the means of transportation are secured.

The locking device 48 may for this purpose further comprise a sensor device, which may be adapted for sensing and/or detecting whether a stowage compartment 42 is properly inserted in the stowage cavity 30 and locked and/or fastened and/or secured therein. The sensor device may for this purpose comprise an optical sensor, such as an infrared sensor or a laser sensor, and/or an electrical sensor, and/or an electronic sensor, and/or a magnetic sensor.

Figure 2:
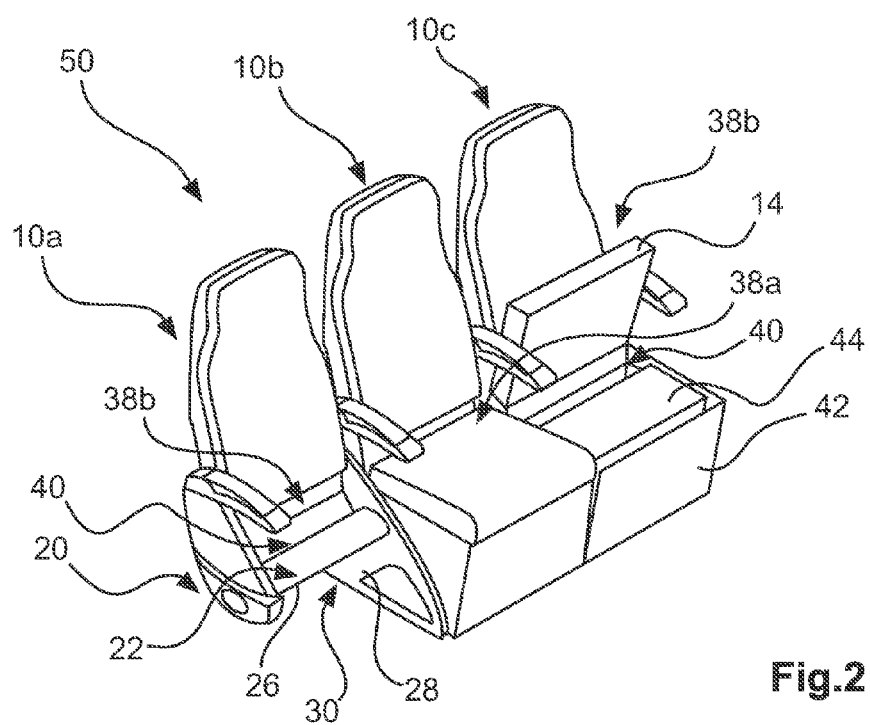
FIG. 2 schematically shows a perspective view of a seat arrangement comprising passenger seats according to an embodiment.

FIG. 2 schematically shows a perspective view of a seat arrangement 50 comprising three passenger seats 10A, 10B, 10C according to an embodiment. If not stated otherwise, the passenger seats 10A, 10B, 10C of FIG. 2 may comprise the same features and elements as the passenger seat 10 of FIG. 1.

The seat arrangement 50 may be a row of passenger seats in a means of transportation, such as e.g. an aircraft. Therein, the passenger seats 10A,10B, and 10C are arranged in juxtaposition and schematically show various configurations and/or embodiments of the inventive passenger seat as described in the following.

Therein, passenger seat 10A shows a configuration and/or an embodiment, in which the seat pan 14 with the seat cushion 16 is removable from the seat frame 20. Accordingly, the configuration of passenger seat 10A shown in FIG. 2, in which the seat pan 14 is removed from the seat frame 20 corresponds to the stowing position 38B, in which the access 40 is accessible from the top side 22 of the seat frame 20, such that a stowage compartment 42 is insertable through the access 40 into the stowage cavity 30. In the seating position 38A, the seat pan 14 of passenger seat 10A may be mounted to the seat frame 20 with the mounting device 32. The seating position 38A of passenger seat 10A may e.g. be illustrated by means of the passenger seat 10B, in which also the stowage compartment 42 is attached to the beam 26 by means of the locking device 48 as well as locked, fastened, and/or secured.

The passenger seat 10C may, on the other hand, correspond to the configuration and/or embodiment of the inventive passenger seat 10 comprising a pivotably mounted seat pan 14, as described in detail in FIG. 1. However, the seat pan 14 may be pivotably and removably mounted with the mounting device 32.

Figure 3A:
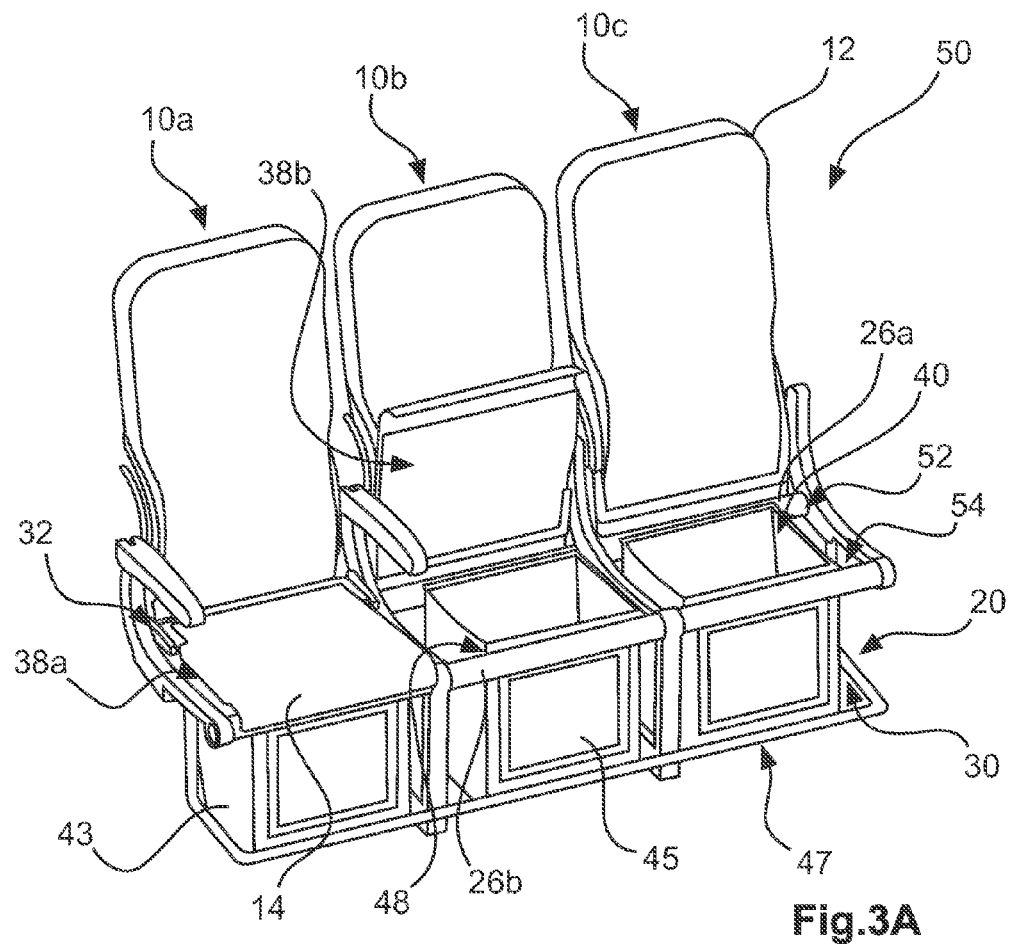
FIG. 3A schematically shows a perspective view of a seat arrangement comprising passenger seats according to a further embodiment.

FIG. 3A schematically shows a perspective view of a seat arrangement 50 comprising three passenger seats 10A, 10B, and 10C according to an embodiment. If not stated otherwise, the passenger seats 10A, 10B, and 10C of FIG. 3A may comprise the same features and elements as the passenger seats 10, 10A, 10B, and 10C of FIGS. 1 and 2.

The seat arrangement 50 shown in FIG. 3 and/or each of the passenger seats 10A to 10C comprise a seat frame 20 with a first beam 26A and a second beam 26B, which are arranged parallel to each other, parallel to the backrest 12 and parallel to the seat pan 14 of each passenger seat 10A-10C, when the seat pan 14 is in the seating position 38A. The first beam 26A provides and/or defines a first boundary 52 of the stowage cavity 30, wherein the first boundary 52 may correspond to a rear boundary of the stowage cavity 30. Moreover, the second beam 26B provides and/or defines a second boundary 54 of the stowage cavity 30, wherein the second boundary 54 may correspond to a frontal boundary of the stowage cavity 30.

The first beam 26B and the second beam 26A are spaced apart from each other in a direction orthogonal to a longitudinal extension direction of the first and second beam 26A and 26B (i.e. in a direction orthogonal to the first and second beam 26A and 26B), such that the access 40 is provided between the first and the second beam 26A and 26B at each passenger seat 10A, 10B, and 10C.

Accordingly, the stowage compartment 42 is insertable into the stowage cavity 30 through the access 40 between the first beam 26A and the second beam 26B at each passenger seat 10A, 10B, and 10C. The respective stowage compartment 42 may be mounted, attached, locked, fastened, and/or secured to at least one of the first beam 26A and the second beam 26B by means of the locking device 48.

Figure 3B:
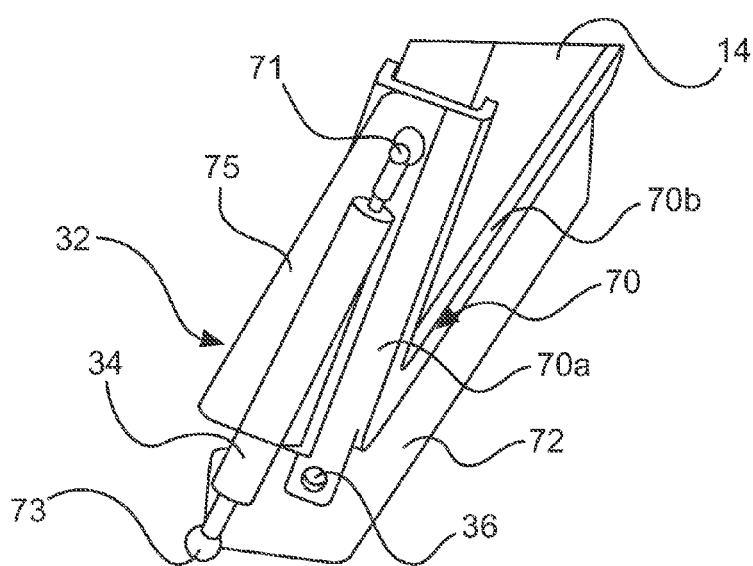
FIG. 3B schematically shows a seat pan and a mounting device of a passenger seat of FIG. 3A.

FIG. 3B schematically shows a seat pan 14 and a mounting device 32 of a passenger seat of FIG. 3A.

The mounting device 32 comprises a pan holder 70, which comprises a lateral holding element 70A, a base holding element 70B and a further lateral holding element (not shown) opposing the lateral holding element 70A. The lateral holding element 70B and the further lateral holding element are arranged on opposing ends off the base holding element 70B, such that the pan holder 70 has a U-shape and such that the seat pan 14 may be at least partially encompassed by the lateral holding element 70B and the further lateral holding element. Moreover, each of the lateral holding element 70A, the base holding element 70B and the further holding element are manufactured from a U-shaped profile, for instance from aluminium, such that the seat pan may be inserted into the respective profiles and partially is encompassed by each of the profiles, respectively.

The seat pan 14 may further be attached to the pan holder 70 by at least one screw joint and/or bolt joint. Also a release button may be arranged on the pan holder 70, such as a spring-loaded button or bolt, which may need to be actuated to unmount and/or detach the seat pan 14 from the pan holder 70.

The mounting device 32 further comprises a hinge element 36 or hinge device 36, with which the pan holder 70 is pivotably mounted to an interface 72 of the mounting device 32. The interface 72 may for instance be attached and/or mounted to the seat frame 20 and/or the backrest 12. The hinge element 36 may for instance comprise a bolt, which may be inserted into a whole in the lateral holding element 70A and the further lateral holding element and which may be pivoted in a respective counterpart arranged on the interface 72.

The mounting device 32 further comprises a spring element 34, which is a gas spring and which is attached with a first end 71 to the lateral holding element 70A and with a second end 73 opposing the first end 71 to the interface 72. On the further lateral holding element a further spring element is arranged. Both the first and the second ends 71 and 73 may be pivotably mounted to the lateral holding element 70A and the interface 72, respectively. The spring element 34 may further be at least partially covered with a cap 75.

Figure 3C:
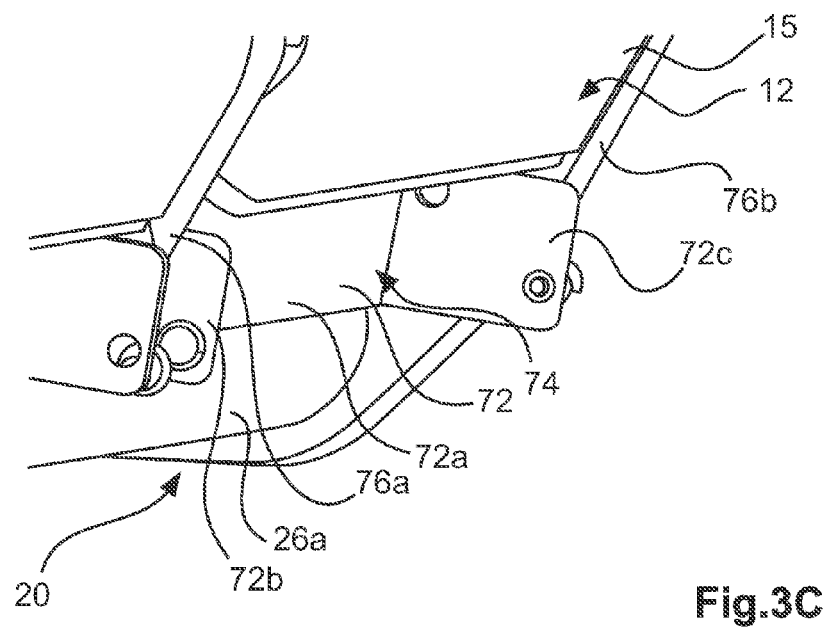
FIG. 3C schematically shows a perspective rear view of a part of a passenger seat of FIG. 3A.

FIG. 3C schematically shows a rear view of a part of a passenger seat 10A, 10B, and 10C of FIG. 3A.

As can be seen, the interface 72 is a U-shaped profile (e.g. manufactured from aluminium) comprising a base element 72A with a first lateral element 72b and a second lateral element 72c both extending substantially orthogonal from the base element 72A.

The interface 70 is mounted within a cavity 74 arranged between the backrest 12 and the first beam 26A to the seat frame 20. Therein, the first and the second lateral elements 72b, 72c are mounted e.g. with at least one screw joint to a first extension 76A and a second extension 76B of the seat frame 20, respectively, such that both lateral elements 72b, 72c are directed away from the seat pan 14, i.e. they are directed in the same direction as the rear surface 15 of the backrest 12. The first and second extension 76A, 76B may partially encompass the backrest 12 on a lower end thereof and they may be mounted to the first and/or the second beam 26A and 26B.

Figure 3D:
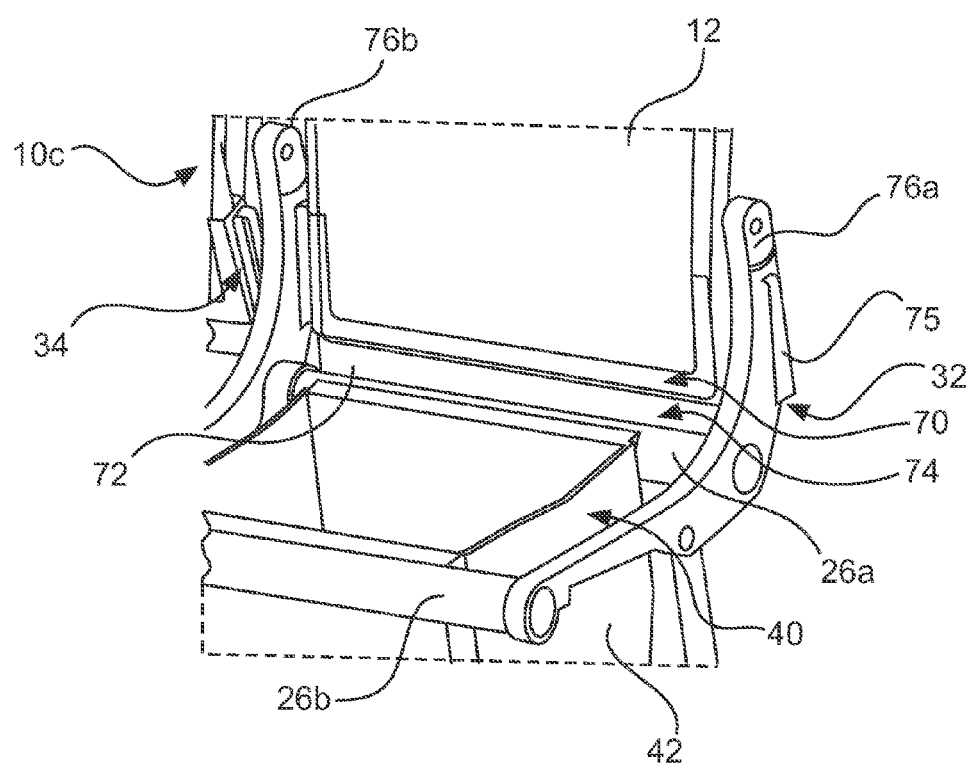
FIG. 3D schematically shows a detailed view of a part of a passenger seat of FIG. 3A.

FIG. 3D schematically shows a detailed view of a part of a passenger seat 10A, 10B, 10C of FIG. 3A.

The cavity 74 between the backrest 12 and the first beam 26A, in which the interface 72 of the mounting device 32 is arranged, is clearly shown in this figure. The cavity 74 may be arranged to support a rotation of the pivotable and/or removable seat pan 14.

Further, FIG. 3D clearly shows that the first and second extension 76A and 76B are traverses, respectively, connecting the second beam 26B and the first beam 26A. The extensions 76A and 76B are thus arranged in a direction orthogonal to the first and second beam 26A and 26B, wherein adjacent to the first beam 26B in direction of a rear side of the passenger seat they are bended in direction of the backrest 12 in order to partially encompass a lower end of the backrest 12, thereby providing an appropriate structure to mount the mounting device 32 thereon.

Figure 4A:
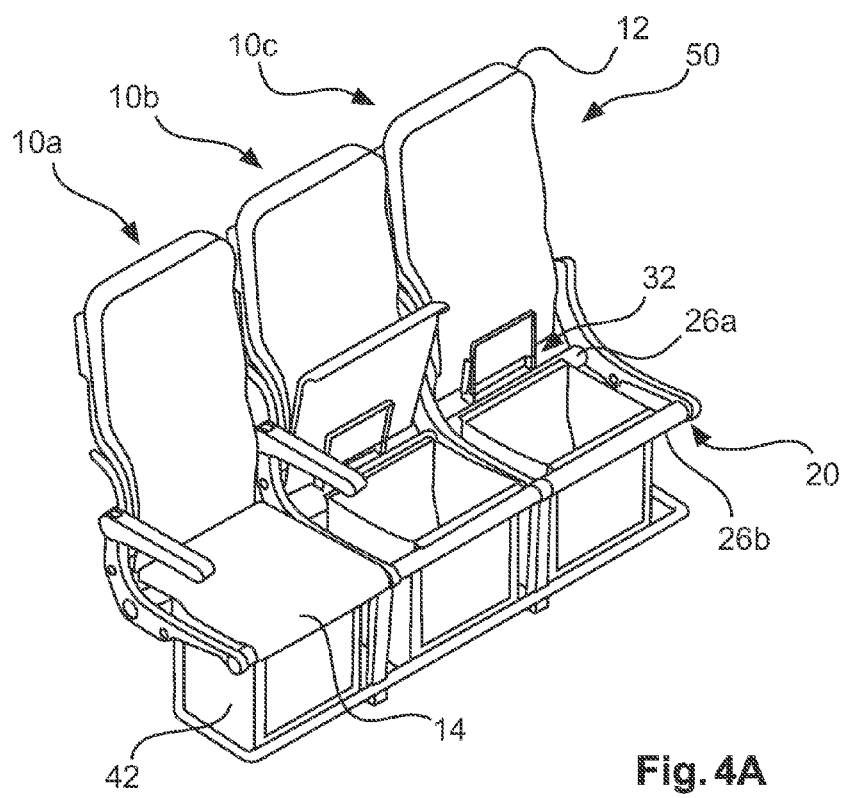
FIG. 4A schematically shows a perspective view of a seat arrangement comprising passenger seats according to a further embodiment.

FIG. 4A schematically shows a perspective view of a seat arrangement 50 comprising passenger seat 10A, 10B, and 10C according to a further embodiment. If not stated otherwise, the passenger seats 10A, 10B, and 10C of FIG. 4A may comprise the same features and elements as the passenger seats shown in previous figures.

The seat pan 14 of the passenger seats 10A, 10B, and 10C, respectively, is removably attached to the mounting device 32 and pivotably mounted to the seat frame 20.

Figure 4B:
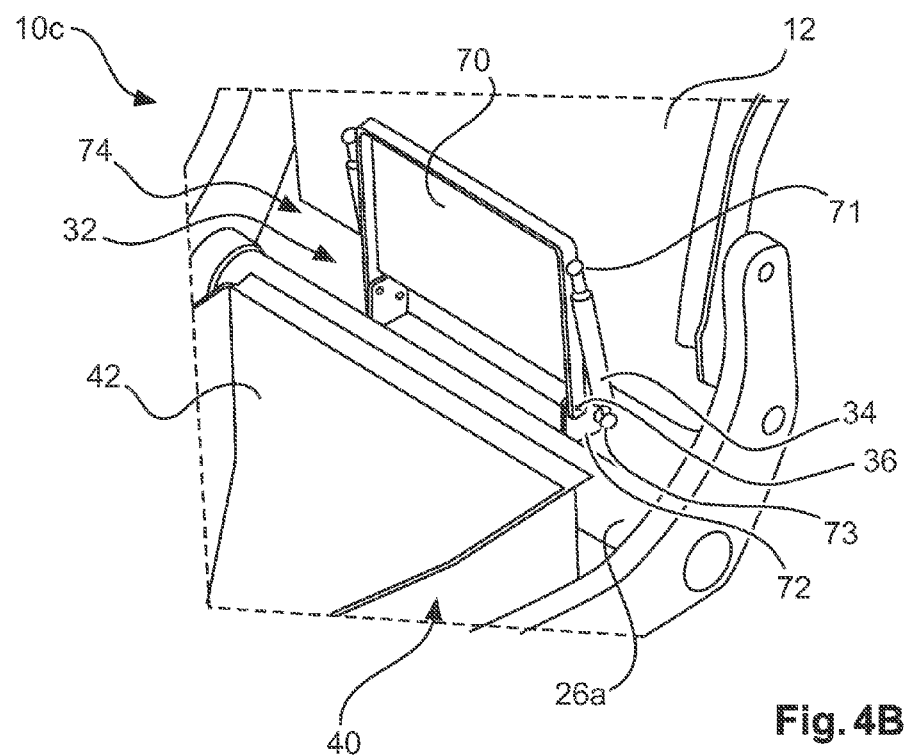
FIG. 4B schematically shows a perspective view of a part of a passenger seat of FIG. 4A.

FIG. 4B schematically shows a perspective view of a part of a passenger seat of FIG. 4A, wherein the mounting device 32 is shown in detail.

The mounting device 32 comprises an interface 72, which is mounted to the first beam 26A within the cavity 74. On either lateral side of the interface 72 a second end 73 of a spring element 34, which is a gas spring, is mounted. The respective first end 71 of each spring element 34 is mounted to a mounting plate 70, which is adapted to carry the seat pan 14.

Figure 4C:
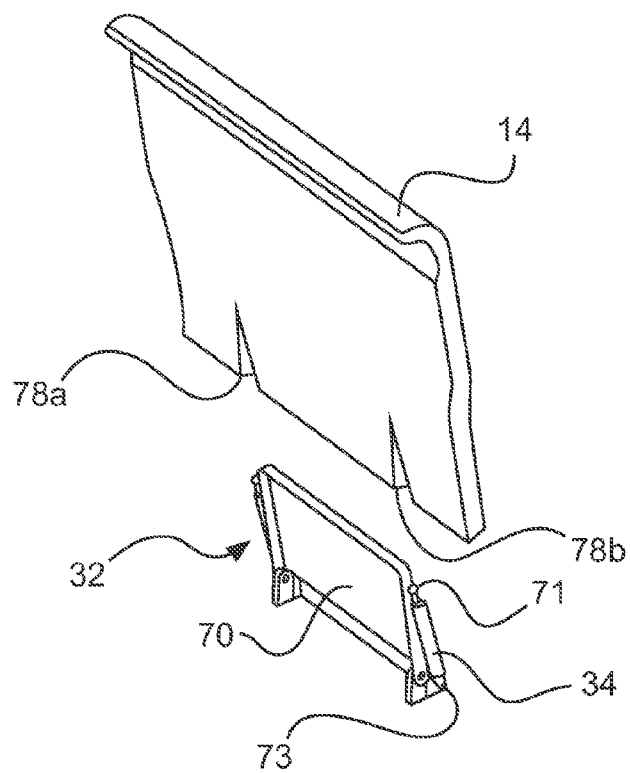
FIG. 4C schematically shows a seat pan and a mounting device of a passenger seat of FIG. 4A.

FIG. 4C schematically shows the seat pan 14 and the mounting device 32 of a passenger seat of FIG. 4A. The seat pan comprises two recesses 78A and 78B, in which each a spring element 34 of the mounting device 32 may at least partially be arranged, when the seat pan 14 is mounted to the mounting device 32. The seat pan 14 may be fixed and/ mounted to the mounting plate 70 by at least one screw joint.

Figure 5:
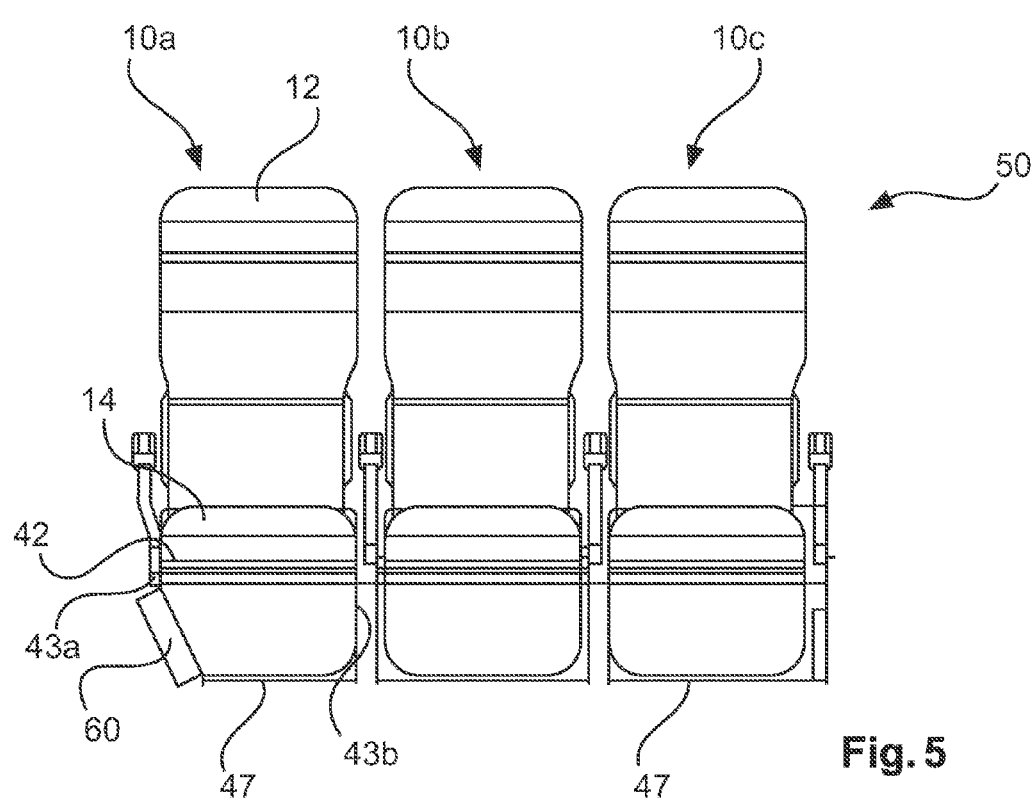
FIG. 5 schematically shows a front view of a seat arrangement with passenger seats according to an embodiment.

FIG. 5 schematically shows a front view of the seat arrangement 50 with passenger seats 10A, 10B, and 10C according to an embodiment.

Generally, the stowage compartment 42 is bin-like shaped and comprises two lateral sides 43A and 34B, a bottom side 47, a front side and a rear side. Due to e.g. potential obstacles and/or according to a free space available aboard the means of the transportation, each of the sides of the stowage compartment 42 may be arranged arbitrarily with respect to the bottom side 47, such as inclined and/or angled, and/or each side may have an arbitrary shape, such as a rounded shape and or a polygon-like shape. In other words, a geometry of the stowage compartment 42 may reflect the space available for the stowage compartment 42.

For instance in FIG. 5 a part of a fuselage 60 of the means of transportation is shown, which may e.g. be a fuselage 60 of an aircraft, a train or a bus. The fuselage 60 may impose a certain boundary condition to a size and/or a shape of the stowage compartment 42. For instance, the stowage compartment 42 arranged underneath the seat pan 14 of passenger seat 10A comprises a lateral side 43A, which is at least partially angled and/or inclined and/or sloped with respect to the bottom side 47, since a part of a fuselage 60 extends underneath the seat pan 14.

However, to account for obstacles, such as the fuselage 60, a size of the stowage compartment 42 may be adapted correspondingly. For instance a lateral dimension, i.e. a distance between the two lateral sides 43A and 43B, may be reduced in order to fit in a respective stowage cavity 30.

Possible dimensions of the stowage compartment 42 may for instance range from approximately 200 mm to approximately 600 mm in width, in height and in depth, respectively.

Figure 6:
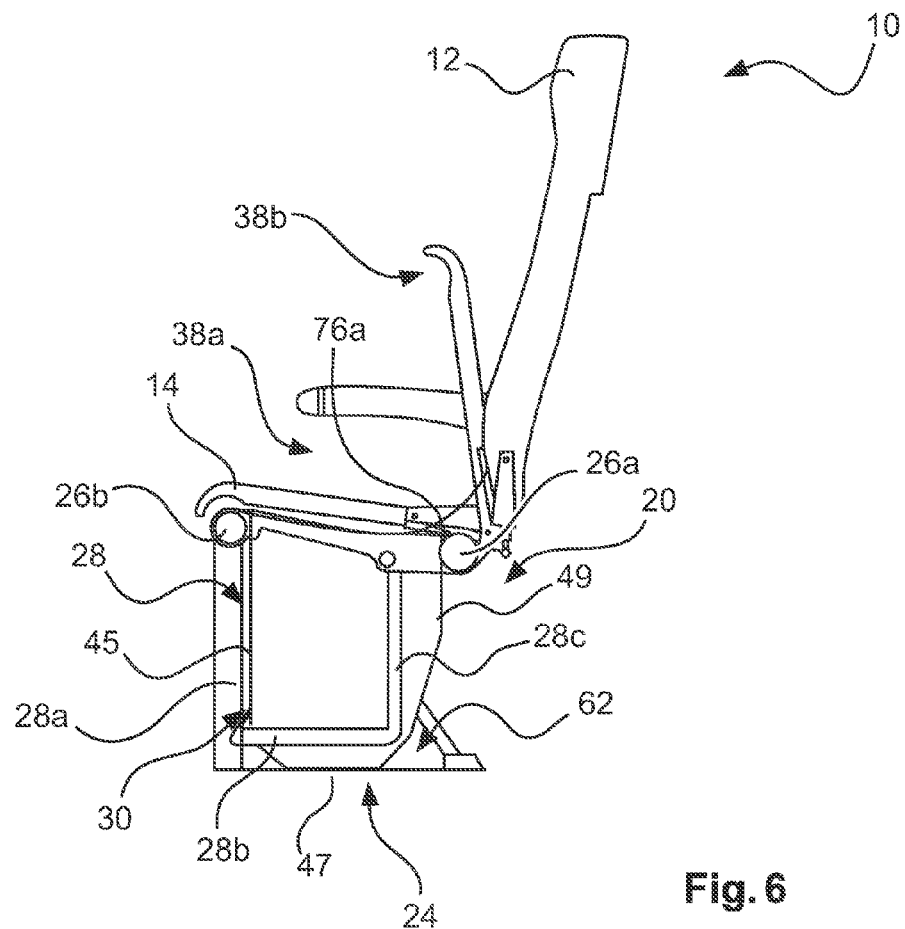
FIG. 6 schematically shows a side view of a passenger seat according to a further embodiment.

FIG. 6 schematically shows a side view of a passenger seat 10 according to a further embodiment. If not stated otherwise, the passenger seat 10 of FIG. 6 may comprise the same features and elements as the passenger seats 10, 10A, 10B, and 10C of FIGS. 1 to 5.

As can be seen, a rear side 49 of the stowage compartment 42, which may be directed towards a further passenger sitting behind the passenger seat 10, is at least partially arranged in an obtuse angle with respect to the bottom side 47, i.e. the rear side 49 is at least partially angled and/or inclined and/or sloped with respect to the bottom side 47. As a consequence, a cavity 62 for accommodating a foot of the further passenger sitting behind passenger seat 10 is provided, which advantageously may increase a comfort and/or a legroom for this passenger. The cavity 62 may in this context denote a free space, i.e. a space free of obstacles and/or structural elements, such that the further passenger may stretch out his legs and/or feet into that space.

Further, FIG. 6 depicts a possible configuration of a seat leg 28. The seat leg 28 comprises a first part 28A extending from the second beam 26B in orthogonal direction towards the bottom side 24 of the seat frame 20. On the first part 28A, a second part 28B extends in orthogonal direction from the first part 28A and, which is bended in direction of the top side 22 of the seat frame 20, thereby extending in a third part 28C, which is in turn mounted the lateral extension and/or traverse 76A.

Figure 7:
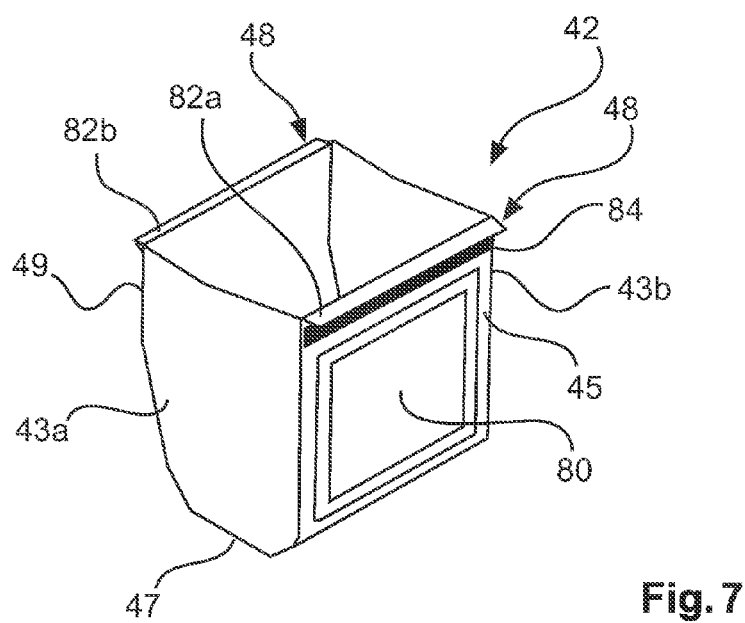
FIG. 7 schematically shows a perspective view of a stowage compartment of a passenger seat according to an embodiment.

FIG. 7 schematically shows a perspective view of a stowage compartment 42 of a passenger seat according to an embodiment.

The stowage compartment is bin-like shaped comprising a rear side 49, a front side 45, a bottom side 47 and two lateral sides 43A and 43B.

In the front side 45 a net and/or a flap 80 is arranged, which may allow access for a passenger to items stored in then stowage compartment 42 while it is arranged and/or installed and/or mounted underneath the passenger seat 10 in the stowage cavity 30.

Further, FIG. 7 shows the locking device 48 in detail, which comprises a first hook-like extension 82A arranged on the front side 45 and a second hook-like extension 82B arranged on the rear side 49. The extensions 82A and 82B are arranged on an edge on a top side of the stowage compartment 42 opposing the bottom side 47 and may extend orthogonally from the front and the rear side 45, 49, respectively, thereby being directed away from the stowage compartment 42. The first and second extension 82A and 82B may for instance be or comprise a flexible clamp.

Apart from that, the locking device 48 comprises a flexible band 84, e.g. a rubber or silicon band, arranged on the front and the rear side 45, 49 below the first and second extension 82A and 82B, respectively. The flexible band 84 may be configured to prevent vibrations of the stowage compartment 42, thereby potentially reducing and/or eliminating noise from the vibrations.

Figure 8:
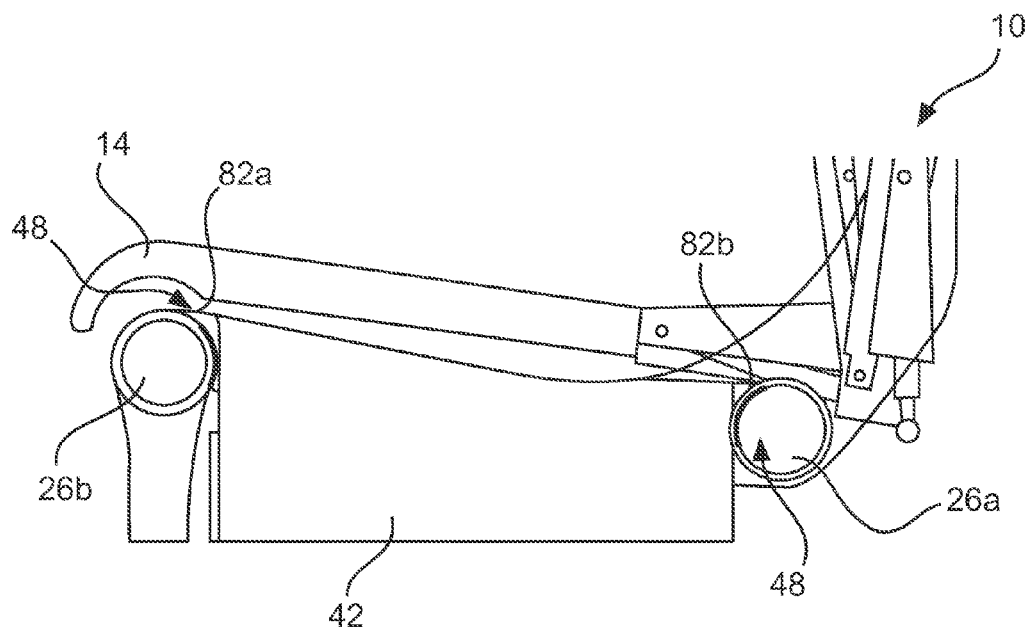
FIG. 8 schematically shows a detailed side view of a stowage compartment in a passenger seat according to an embodiment.

FIG. 8 schematically shows a detailed side view of a stowage compartment 42 in a passenger seat 10 according to an embodiment.

As can be seen, when the stowage compartment 42 is arranged and/or installed in the stowage cavity 30, the first extension 82A of the locking device 48 is at least partially deposited on the second beam 26B, and the second extension 82B is at least partially deposited on the first beam 26B. The stowage compartment 42 may be fixed in the stowage cavity 30 by a friction fit of the locking device 48 and at least one of the first and the second beam 26A and 26B. At least one of the first and the second extension 82A and 82B may be loosely attached to the respective beam 26A and 26B, and at least one of the extensions 82A and 82B may be configured in a flexible manner and may for instance be fixed on the respective beam 26A and 26B with at least one screw. This may allow flexible positioning of the stowage compartment 42 along a longitudinal direction of the beams 26A and 26B, i.e. in transverse direction of the passenger seat 10 as well as a flexible locking and/or fastening of the stowage compartment 42 by means of the locking device 48. However, also both of the extensions 82A and 82B may either be fixed with a screw joint.

Any movement of the stowage compartment 42 in direction orthogonal to the beams 26A and 26B may be prevented by the beams 26A and 26Ab and the locking device 48, and any movement in direction of the seat pan 14 may be prevented by the seat pan 14 itself, such that the stowage compartment 42 is fixed in all directions within the stowage cavity 30.

Further, inside the stowage compartment 42 and/or on a side of the seat pan 14 opposing the seating area 18, a mirror may be arranged, which both may allow a visual check of an interior of the stowage compartment 42 e.g. by the crew of the means of transportation, when the seat pan 14 is in the stowage position 38B.

Figure 9A:
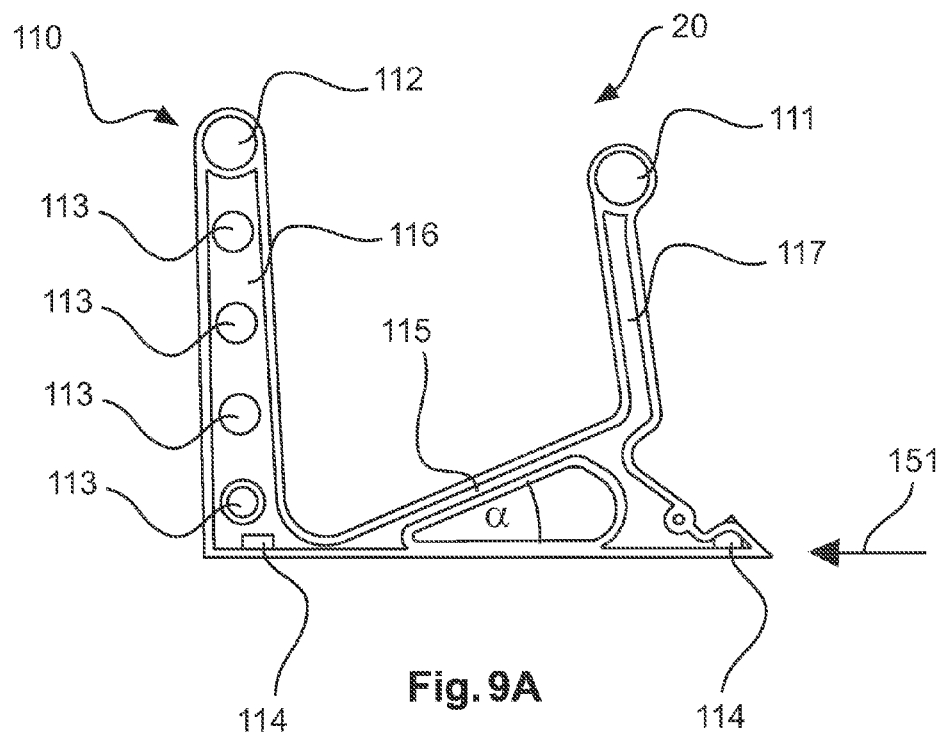
FIG. 9A schematically shows a detailed side view of a second seat leg with a strut according to an embodiment.

FIG. 9A schematically shows a detailed side view of a second seat leg 110 with an inclined strut 115. As the inclined strut 115 is a part of the seat frame 20, it may be manufactured from the same material as the seat frame 20. This material may for instance be selected from the group comprising composite material, plastic material, and aluminium. One second seat leg 110 may approximately weigh between 3 kilograms and 4 kilograms. There may further be an angle, i. e. inclination angle, between the inclined strut 115 and a horizontal axis 151 of the passenger seat 10, 10A-10C. This angle may be less than 45 degrees. In a preferred embodiment this angle may be between 15 degrees and 25 degrees. Such an arrangement provides an enhanced energy transmission within the seat frame 20. The seat frame 20 further comprises two mounting points 114 which may provide a means for mounting the seat frame 20 to a floor of the means of transportation. The mounting points 114 may be screw joints, clamp joints, or any other suitable joints and/or means of attachment including welding and/or soldering. The second seat leg 110 may also comprise a front leg 116 and a rear leg 117 being connected to each other at least via the inclined strut 115. The rear leg 117 may comprise a first opening 111 and the front leg 116 may comprise a second opening 112, both openings 111, 112 being adapted for mounting the first beam 26A and the second beam 26B, respectively. The openings 111 and 112 may for instance be circular or tube-like. For example, the first beam 26A may be mounted and/or attached to the first opening 111 and the second beam 26B may be mounted and/or attached to the second opening 112. The front leg 116 may comprise further openings 113 providing means for attaching and/or mounting other elements which are not shown in FIG. 9A. The further openings 113 may also reduce the weight of the seat frame 20 while still fulfilling stability requirements and/or requirements for energy transmission within the second seat leg 110.

Figure 9B:
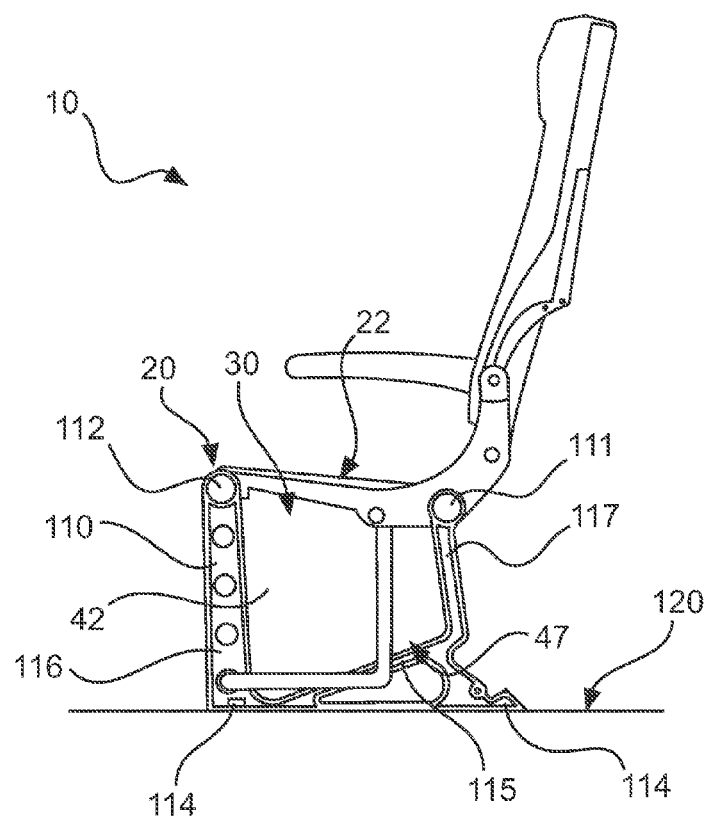
FIG. 9B schematically shows a side view of a passenger seat comprising a second seat leg with a strut and a stowage compartment according to an embodiment.

FIG. 9B schematically shows a side view of a passenger seat 10, 10A-10C comprising a backrest 12, a second seat leg 110 with an inclined strut 115 and a stowage compartment 42. The second seat leg 110 may comprise an inclined strut 115 which, for instance, connects the front leg 116 to the rear leg 117 of the second seat leg 110. The second seat leg 110 may be attached and/or mounted to a floor 120 of the means of transportation via the mounting points 114, wherein the floor 120 of the means of transportation may be arranged parallel to a horizontal axis 151 of the passenger seat 10, 10A-10C. The first opening 111 which may be arranged in a region at the top side 22 of the seat frame 20 may be adapted for mounting and/or attaching the first beam 26A. The second opening 112 which is also arranged in a region at the top side 22 of the seat frame 20 may be adapted for mounting and/or attaching the second beam 26B. Therein, the stowage compartment 42 may be inserted into the stowage cavity 30 of the seat frame 20. In case the stowage compartment 42 is inserted into the stowage cavity 30 of the seat frame 20, the stowage compartment 42 may rest in a position such that the stowage compartment 42 is detachably mounted to the first beam 26A and/or to the second beam 26B. If the stowage compartment 42 is inserted into the stowage cavity 30 of the seat frame 20, the bottom side 47 of the stowage compartment 42 may further be parallel to the inclined strut 115. Therefore, the inclined strut 115 is adapted such that a cavity for accommodating a foot of a further passenger sitting behind the passenger seat 10, 10A-10C is provided.

Figure 9C:
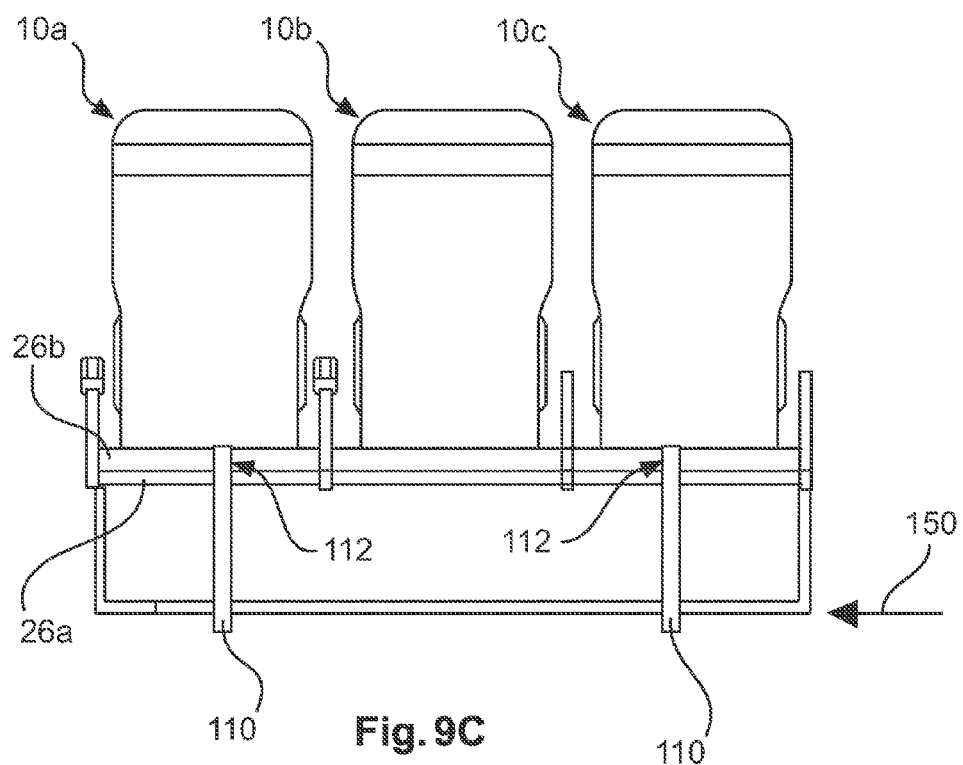
FIG. 9C schematically shows a front view of a seat arrangement with three passenger seats comprising two second seat legs according to an embodiment.

FIG. 9C schematically shows a front view of a seat arrangement with three passenger seats 10, 10A-10C, i. e. a row of passenger seats 10, 10A-10C, comprising two second seat legs 110. In this exemplary embodiment the second seat legs 110 are placed under the passenger seat 10A and under the passenger seat 10C. However, the second seat leg 110 may also be placed under the passenger seat 10B. Also shown is the first beam 26A and the second beam 26B, both beams being arranged parallel to each other and parallel to a transversal axis 150 of the passenger seats 10A-10C. The second beam 26B may be mounted and/or attached to the second openings 112 of the second seat legs 110. These second openings 112 may for instance be arranged at the front legs 116 of the second seat legs 110.

Figure 9D:
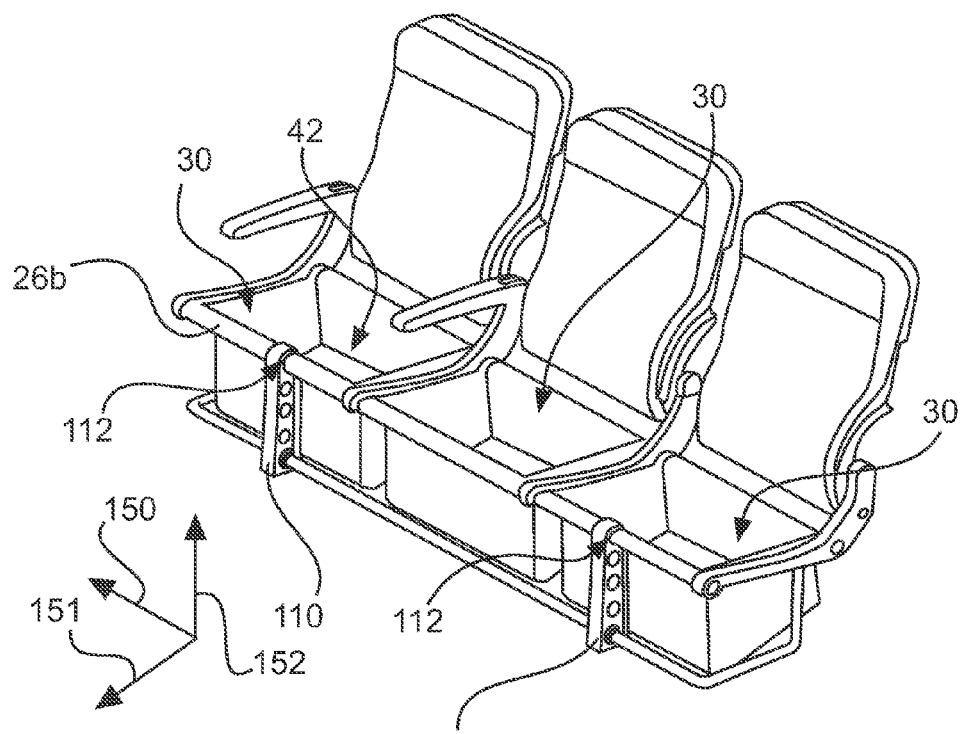
FIG. 9D schematically shows a perspective view of a seat arrangement with three passenger seats and two second seat legs according to an embodiment.

FIG. 9D schematically shows a perspective view of a seat arrangement with three passenger seats 10, 10A-10C and two second seat legs 110. A coordinate system with a horizontal axis 151, a transversal axis 150 and a vertical axis 152 of the passenger seat 10, 10A-10C is shown. The horizontal axis 151 of the passenger seat 10, 10A-10C may also be a horizontal axis of the stowage compartment 42. The transversal axis 150 may be parallel to the first beam 26A and to the second beam 26B whereas the horizontal axis 151 and the inclined strut 115 which is not shown in FIG. 9D enclose an angle of less than 45 degrees. The floor 120 of the means of transportation may be parallel to the horizontal axis 151 of the passenger seat 10, 10A-10C. The floor 120 may also be configured such that the arrangement of seats 10, 10A-10C may be mounted and/or attached to the floor 120 of the means of transportation. FIG. 9D further shows a configuration in which stowage compartments 42 are inserted into the stowage cavities 30 of each of the passenger seats 10, 10A-10C. The lid of the stowage compartment 42 as well as the seat pan 14 of the passenger seat 10, 10A-10C is not shown in FIG. 9D. The stowage compartments 42 may be detachably mounted to the first beam 26A and the second beam 26B which beams may be arranged parallel to the transversal axis 150. The first beam 26A is mounted and/or attached to the first opening 111 of the second seat leg 110 and the second beam 26B is mounted and/or attached to the second opening 112 of the second seat leg 110.

Figure 9E:
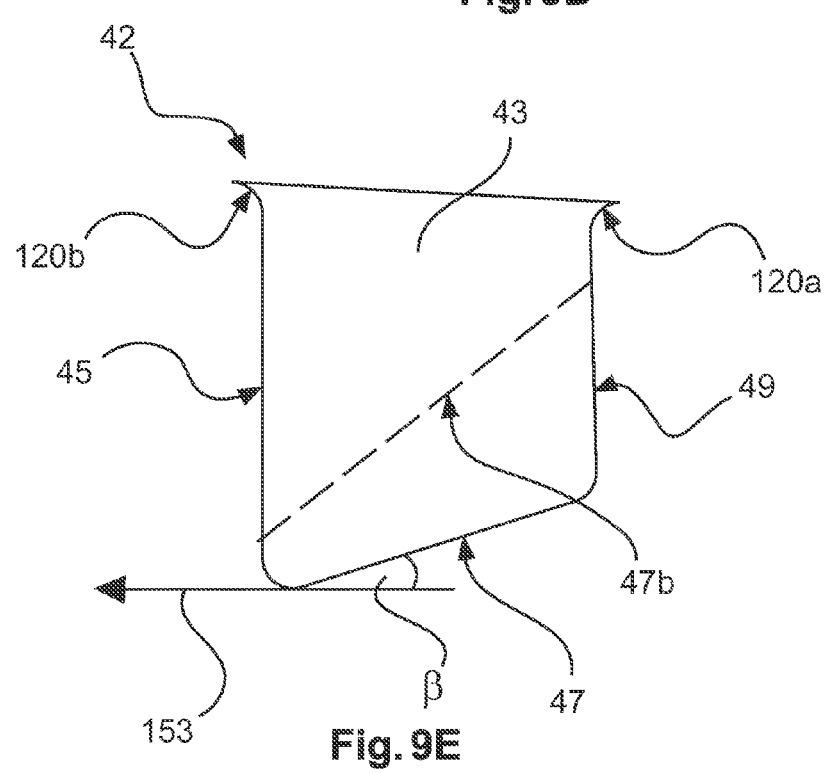
FIG. 9E schematically shows a side view of a stowage compartment for a passenger seat according to an embodiment.

FIG. 9E schematically shows a stowage compartment 42 for a passenger seat 10, 10A-10C according to another embodiment. The stowage compartment 42 may be bin-like shaped and comprises a bottom side 47, 47B, a front side 45, a rear side 49 and two lateral sides 43 and 43A. There exist different possibilities to arrange the bottom side 47, 47B of the stowage compartment 42. The stowage compartment 42 with the bottom side 47B is a preferred embodiment. The stowage compartment 42 of this preferred embodiment accommodates about two-thirds of the stowage capacity compared to the stowage capacity of a stowage compartment 42 with the bottom side 47. The preferred embodiment of the stowage compartment 42 accommodates for example approximately 27 liters and/or approximately 23 kilograms whereas the stowage capacity of a stowage compartment 42 with the bottom side 47 amounts to approximately 41 liters. The weight of the stowage compartment 42 may be between 0.5 kilograms and 2 kilograms. In the preferred embodiment the stowage compartment 42 weighs approximately 1 kilogram. The bottom side 47, 47B may be inclined with respect to a horizontal axis 153 of the stowage compartment 42. The horizontal axis 153 of the stowage compartment 42 may be parallel to the horizontal axis 151 of the passenger seat 10, 10A-10C if the stowage compartment 42 is inserted into the stowage cavity 30. The bottom side 47 and 47B of the stowage compartment 42 may be inclined with respect to the horizontal axis 153 of the stowage compartment 42 or to the horizontal axis 151 of the passenger seat 10, 10A-10C if the stowage compartment 42 is inserted into the stowage cavity 30. An angle between the bottom side 47 and 47B of the stowage compartment 42 and the horizontal axis 153 of the stowage compartment 42 is greater than 0 degrees. The angle may for instance be between 10 and 60 degrees. The angle between the bottom side 47B of the stowage compartment 42 of the preferred embodiment and the horizontal axis 153 of the stowage compartment 42 may be greater than the angle between the bottom side 47 of the stowage compartment 42 and the horizontal axis 153 of the stowage compartment 42. Hence, the preferred embodiment of the stowage compartment 42 with the bottom side 47B provides more space for accommodating a foot of a further passenger sitting behind the passenger seat 10, 10A-10C than the other embodiment of the stowage compartment 42 with the bottom side 47.

The stowage compartment 42 may further comprise a first bearing surface 120A and a second bearing surface 120B. These bearing surfaces 120A and 120B may have a curved contour and/or may be circular. However, the first bearing surface 120A is adapted for mounting and/or attaching the stowage compartment 42 to the first beam 26A and the second bearing surface 120B is adapted for mounting and/or attaching the stowage compartment 42 to the second beam 26B. The bearing surfaces 120A and 120B may thus be in contact with the beams 26A and 26B of the passenger seat 10, 10A-10C if the stowage compartment 42 is inserted into the stowage cavity 30 such that a load transmission occurs at least at the bearing surfaces 120A and 120B of the stowage compartment 42. The horizontal axis 153 of the stowage compartment 42 may substantially be perpendicular to the front side 45 and/or to the rear side 49 of the stowage compartment 42. In case the stowage compartment 42 is inserted into the stowage cavity 30, the horizontal axis 153 of the stowage compartment 42 may be parallel to the horizontal axis 151 of the passenger seat 10, 10A-10C and the transversal axis 150 of the passenger seat 10, 10A-10C may be perpendicular to the two lateral sides 43 and 43A of the stowage compartment 42.

Possible dimensions of the stowage compartment 42 may for instance range from approximately 200 mm to approximately 600 mm in width, in height and in depth, respectively. The height of the stowage compartment 42 may for instance be measured along the vertical axis 152 of the passenger seat 10, 10A-10C if the stowage compartment 42 is inserted into the stowage cavity 30. Accordingly, the width may be measured along the transversal axis 150 of the passenger seat 10, 10A-10C and the depth may be measured along the horizontal axis 151 of the passenger seat 10, 10A-10C and/or the horizontal axis 153 of the stowage compartment 42. In a preferred embodiment the height of the stowage compartment 42 is approximately 400 mm and the depth is approximately 300 mm.

Figure 10A:
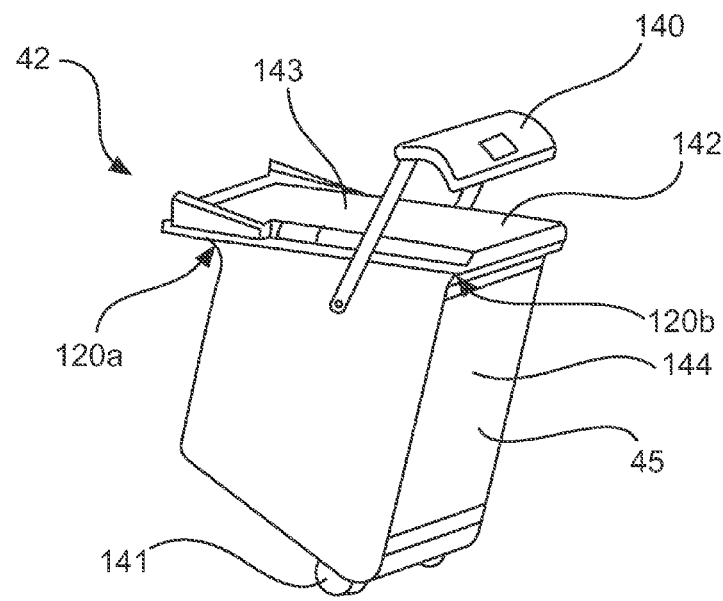
FIG. 10A schematically shows a perspective view of a stowage compartment with a hingeable handle according to another embodiment.

FIG. 10A schematically shows a perspective view of a stowage compartment 42 with a hingeable handle 140 for transporting the stowage compartment 42 according to another embodiment. The stowage compartment 42 may further comprise roller wheels 141 such that the stowage compartment 42 may be pulled and/or dragged by a passenger if the stowage compartment 42 is not inserted into the stowage cavity 30. The stowage compartment 42 may comprise a lid 142 which is mounted and/or attached to a top side 143 of the stowage compartment 42. Therein, the lid 142 may also be the seat pan 14 of the passenger seat 10, 10A-10C if the stowage compartment 42 is inserted into the stowage cavity 30. The front side 45 of the stowage compartment 42 may further comprise doors and/or flaps 144 so that the stowage compartment 42, if the it is inserted into the stowage cavity 30, may be loaded or unloaded, i. e. while the passenger is sitting on the passenger seat 10, 10A-10C and thus also on the lid 142 of the stowage compartment 42. In other words, the doors and/or flaps 144, which may also be replaced by a net, may allow access for a passenger to items stored in then stowage compartment 42 while it is arranged and/or installed and/or mounted underneath the passenger seat 10, 10A-10C in the stowage cavity 30.

Figure 10B:
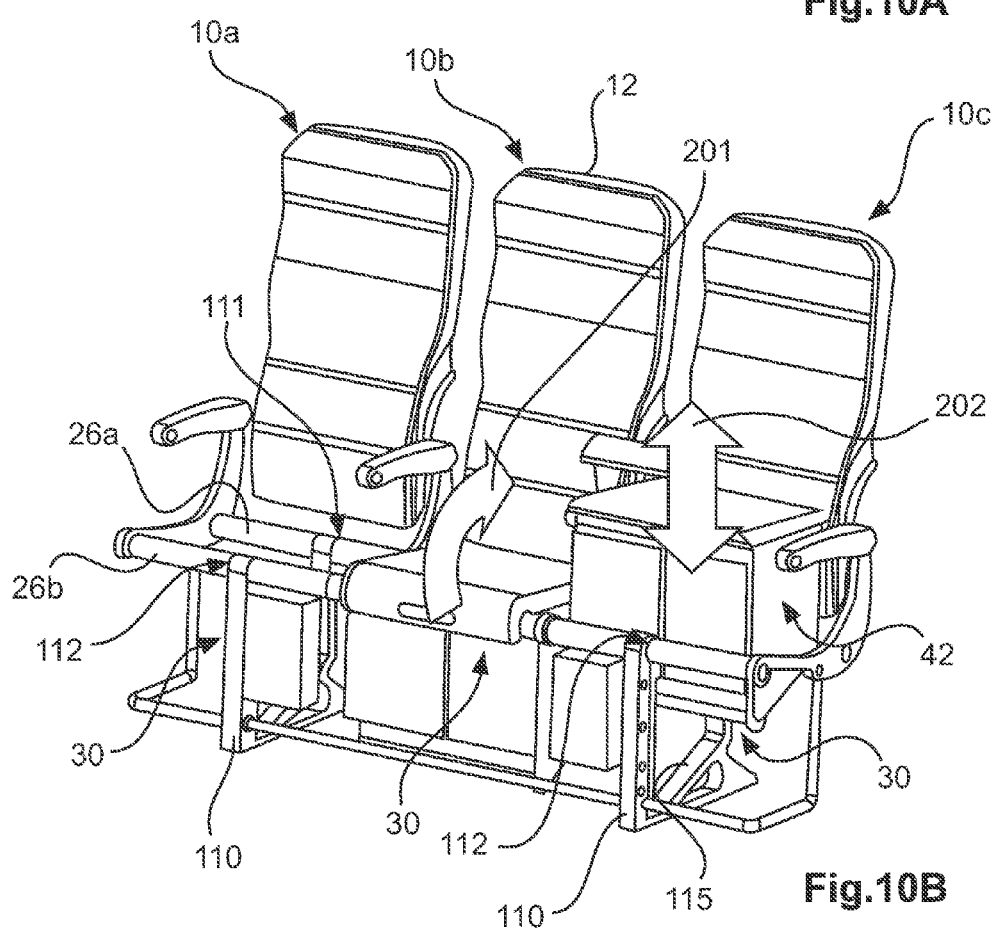
FIG. 10B schematically shows a perspective view of a seat arrangement with three passenger seats and two second seat legs according to an embodiment.

FIG. 10 B schematically shows a perspective view of a seat arrangement with three passenger seats 10, 10A-10C and two second seat legs 110. The passenger seat 10B shows a configuration in which the stowage compartment 42 is inserted into the stowage cavity 30. In this configuration the lid 142 of the stowage compartment 42 is the seat pan 14 of the passenger seat 10B. The hingeable handle 140 of the stowage compartment 42, which is folded down in this case, is therefore adapted to serve as a means for cushioning the front edge of the seat pan 14 in a region at the second beam 26B. Simultaneously the hingeable handle 140 may serve as a locking device while it is folded down. The stowage compartment 42 may be unlocked if the hingeable handle 140 is unfolded by moving the hingeable handle 140 in a first direction 201 towards the backrest 12 of the passenger seat 10B. The first direction 201 may describe a rotational movement of the hingeable handle 140 which may thus be pivotably mounted and/or attached to the stowage compartment 42, e. g. to the two lateral sides 43 and 43A of the stowage compartment 42. The hingeable handle 140 may serve as a means for unlocking the stowage compartment 42 and/or lifting the stowage compartment 42 out of the stowage cavity 30 which is shown in the configuration of passenger seat 10C. The hingeable handle 140 may therefore be moved in a second direction 202, which for instance is parallel to the vertical axis 152 of the passenger seat 10B, in order to pull the stowage compartment 42 out of the stowage cavity 30 of the passenger seat 10B. The hingeable handle 140 may also serve as a means for pulling and/or dragging the stowage compartment 42. In this manner a passenger may pull and/or drag the stowage compartment 42 like a trolley in case the stowage compartment 42 is not inserted into the stowage cavity 30 of the passenger seat 10, 10A-10C. The stowage compartment 42 may in a further exemplary embodiment be in contact with the inclined strut 115 if the stowage compartment 42 is inserted into the stowage cavity 30.

Figure 11A:
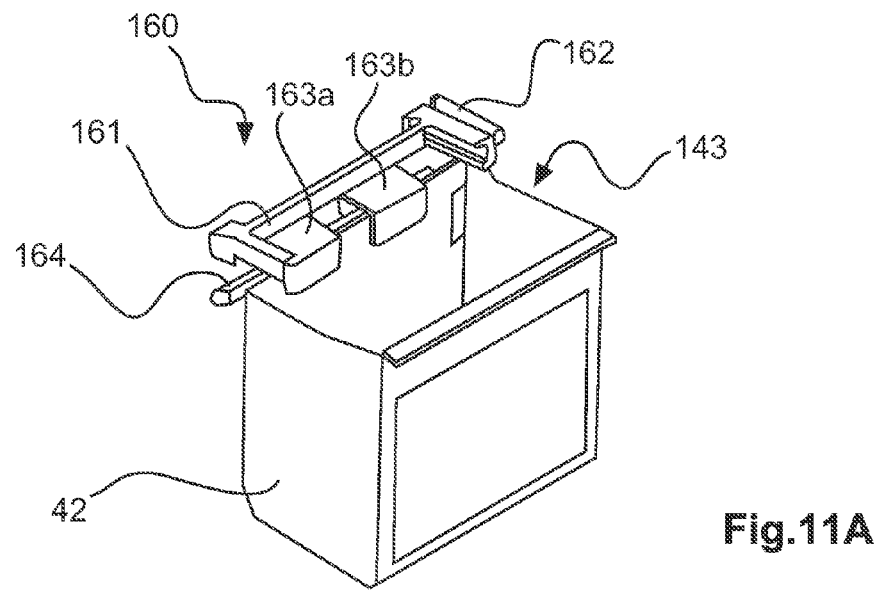
FIG. 11A schematically shows a perspective view of a stowage compartment with an attachment system according to an embodiment.

FIG. 11A schematically shows a perspective view of a stowage compartment 42 with an attachment system 160. The attachment system 160 may comprise a first attachment unit 161 for attaching and/or mounting the seat pan 14 to the stowage compartment 42, a second attachment unit 164 for attaching and/or mounting the stowage compartment 42 to the beams, a gas-filled shock absorber 162 and/or stiffening units 163A and 163B for stiffening and/or strengthening the stowage compartment 42 in a region at the top side 143 of the stowage compartment 42. The stiffening units 163A, 163B, for example L-brackets, may be L-shaped or C-shaped and manufactured from a material selected from the group comprising composite material, plastic material, and aluminium. The first attachment unit 161 for attaching and/or mounting the seat pan 14 may be C-shaped or U-shaped. The seat pan 14 may at least partly be inserted into the first attachment unit 161, for example with the help of a slide mechanism. The gas-filled shock absorber 162 is for instance a damper which is protected by a protection means.

Figure 11B:
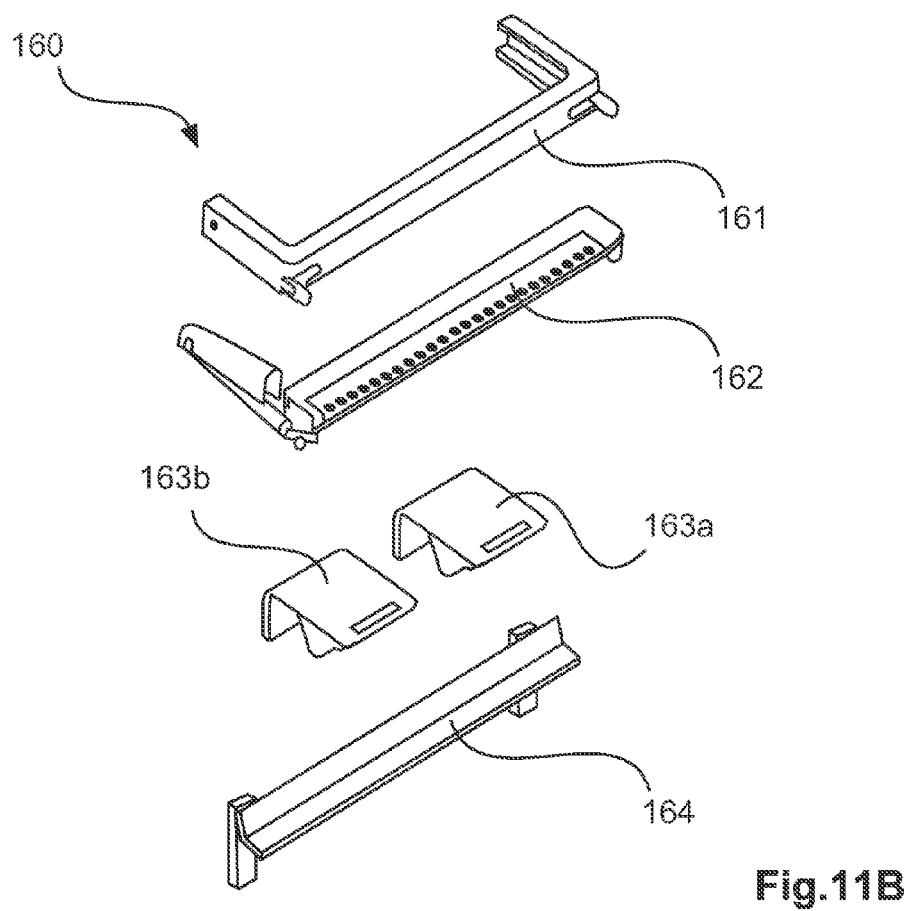
FIG. 11B schematically shows an exploded view of an attachment system for a stowage compartment according to an embodiment.

FIG. 11B schematically shows an exploded view of an attachment system 160 for a stowage compartment 42. The attachment system 160 may weigh between 0.5 and 1.0 kilograms.

Figure 12:
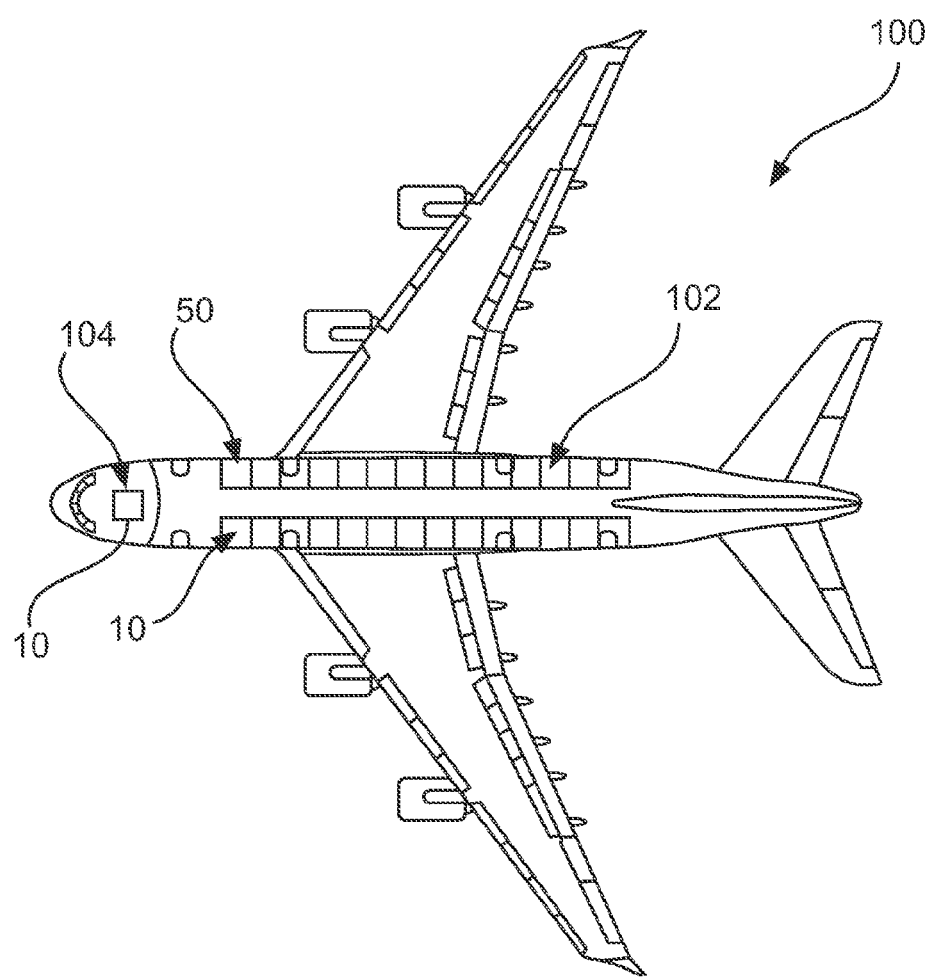
FIG. 12 schematically shows an aircraft with a passenger seat according to an embodiment.

FIG. 12 schematically shows an aircraft 100 with a cabin 102 comprising a plurality of seat arrangements 50. Each seat arrangement 50 may comprise a plurality of passenger seats 10, as described in the above and in the following, which may be arranged in juxtaposition. The seat arrangements 50 with the passenger seats 10 may be arranged one after the other in a plurality of rows in the cabin 102.

Also in a cockpit 104 of the aircraft 100 at least one passenger seat 10 may be arranged. All passenger seats 10 in the aircraft may comprise the same features and elements as the passenger seats 10, 10A, 10B, 10C of FIGS. 1 to 8.

While the embodiment has been illustrated and described in detail in the drawings and the foregoing description, such illustration and description are to be considered illustrative and exemplary and not restrictive; the embodiment is not limited to the disclosed embodiments. Other variations to the disclosed embodiments may be understood and effected by those skilled in the art and practicing the claimed embodiment, from a study of the drawings, the disclosure, and the appended claims. In the claims the term "comprising" does not exclude other elements, and the indefinite article "a" or "an" does not exclude a plurality. The mere fact that certain measures are recited in mutually different dependant claims does not indicate that a combination of these measures cannot be used to advantage. Any reference signs in the claims should not be construed as limiting the scope of protection.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A passenger seat for a means of transportation, the passenger seat comprising:
    a seat frame with a top side, which top side is configured for supporting a seat pan with a seat cushion for providing a seating area for a passenger, and a bottom side opposing the top side;

a stowage cavity arranged between the top side and the bottom side of the seat frame;

wherein the seat frame further comprises a first beam and a second beam, both beams being arranged parallel to each other and parallel to a transversal axis of the passenger seat;

wherein the top side of the seat frame provides an access to the stowage cavity;

the passenger seat further comprising a stowage compartment unit, which is configured to accommodate an item of luggage, is insertable into the stowage cavity through the access, and is removable leaving the stowage cavity free of any items;

wherein the first beam and the second beam are adapted for mounting the stowage compartment;

wherein the seat frame comprises an inclined strut extending in a region of the bottom side of the seat frame; and wherein an angle between the inclined strut and a horizontal axis of the passenger seat is less than 45 degrees.

2. The passenger seat according to claim 1, wherein the angle is between 15 degrees and 25 degrees.

3. The passenger seat according to claim 1, wherein the seat pan is pivotably mounted with a mounting device to the seat frame.

4. The passenger seat according to claim 3, wherein the mounting device comprises a spring element and a hinge element.

5. The passenger seat according to claim 4, wherein the spring element is preloaded in a direction of a backrest and configured to pull the seat pan towards the backrest.

6. The passenger seat according to claim 1, wherein the seat pan is removably attached to the seat frame.

7. The passenger seat according to claim 1, wherein the first beam defines a first boundary of the stowage cavity and the second beam defines a second boundary of the stowage cavity, which second boundary opposes the first boundary, wherein the first beam and the second beam are spaced apart from each other, such that the access is provided between the first beam and the second beam.

8. The passenger seat according to claim 1, wherein the stowage compartment unit is detachably mounted to at least one of the first beam and the second beam of the seat frame.

9. The passenger seat of claim 8, wherein the seat pan provides a lid for the stowage compartment unit.

10. The passenger seat according to claim 1, wherein the stowage compartment unit is bin-like shaped and comprises a bottom side, a front side, a rear side and two lateral sides;

wherein an angle between the bottom side of the stowage compartment unit and a horizontal axis of the stowage compartment unit is greater than 0 degrees such that a cavity for accommodating a foot of a further passenger sitting behind the passenger seat is provided.

11. The passenger seat of claim 10, wherein the angle is between 10 degrees and 60 degrees.

12. The passenger seat according to claim 10, wherein the rear side of the stowage compartment unit is at least partially arranged in an obtuse angle with respect to the bottom side of the stowage compartment unit.

13. The passenger seat according to claim 10, wherein the stowage compartment unit comprises a battery pack for storing electrical energy and a connection element configured for electrically connecting the battery pack to an electric consumer.

14. The passenger seat according to claim 10, wherein the stowage compartment unit comprises a hingeable handle for transporting the stowage compartment unit; and wherein the hingeable handle is adapted to serve as a locking device for holding the stowage compartment unit in the stowage cavity while the hingeable handle is folded down.

15. An aircraft passenger seat, comprising:

a seat frame with a top side, which top side is configured for supporting a seat pan with a seat cushion for providing a seating area for a passenger, and a bottom side opposing the top side;

a stowage cavity arranged between the top side and the bottom side of the seat frame;

wherein the seat frame further comprises a first beam and a second beam, both beams being arranged parallel to each other and parallel to a transversal axis of the passenger seat;

wherein the top side of the seat frame provides an access to the stowage cavity;

the passenger seat further comprising a stowage compartment unit, which is configured to accommodate an item of luggage, is insertable into the stowage cavity through the access, and is removable leaving the stowage cavity free of any items;

wherein the first beam and the second beam are adapted for mounting the stowage compartment;

wherein the seat frame comprises an inclined strut extending in a region of the bottom side of the seat frame; and wherein an angle between the inclined strut and a horizontal axis of the passenger seat is less than 45 degrees, wherein the stowage compartment unit is bin-like shaped and comprises a bottom side, a front side, a rear side and two lateral sides;

wherein an angle between the bottom side of the stowage compartment unit and a horizontal axis of the stowage compartment unit is greater than 0 degrees such that a cavity for accommodating a foot of a further passenger sitting behind the passenger seat is provided.

16. The aircraft passenger seat according to claim 15, wherein the angle is between 15 degrees and 25 degrees.

17. The passenger seat according to claim 16, wherein the seat pan is pivotably mounted with a mounting device to the seat frame.

18. The passenger seat according to claim 17, wherein the mounting device comprises a spring element and a hinge element.

19. The passenger seat according to claim 1, wherein the spring element is preloaded in a direction of a backrest and configured to pull the seat pan towards the backrest.

* * * * *